US011092716B1

(12) United States Patent
Pust et al.

(10) Patent No.: US 11,092,716 B1
(45) Date of Patent: Aug. 17, 2021

(54) METHOD OF DETERMINING SNOWPACK PARAMETERS USING GLOBAL NAVIGATION SATELLITE SYSTEM RECEIVERS

(71) Applicants: Nathan Joel Pust, Bozeman, MT (US); Austin William Beard, Bozeman, MT (US); Paul Winston Nugent, Bozeman, MT (US); Cooper P. McCann, Bozeman, MT (US)

(72) Inventors: Nathan Joel Pust, Bozeman, MT (US); Austin William Beard, Bozeman, MT (US); Paul Winston Nugent, Bozeman, MT (US); Cooper P. McCann, Bozeman, MT (US)

(73) Assignee: NWB Sensors, Inc, Bozeman, MT (US)

( * ) Notice: Subject to any disclaimer, the term of this patent is extended or adjusted under 35 U.S.C. 154(b) by 456 days.

(21) Appl. No.: 16/253,217

(22) Filed: Jan. 22, 2019

Related U.S. Application Data

(60) Provisional application No. 62/620,369, filed on Jan. 22, 2018.

(51) Int. Cl.
*G01W 1/14* (2006.01)
*G01W 1/10* (2006.01)
*G01S 19/28* (2010.01)

(52) U.S. Cl.
CPC ............. *G01W 1/14* (2013.01); *G01S 19/28* (2013.01); *G01W 1/10* (2013.01)

(58) Field of Classification Search
CPC ............ G01W 1/14; G01W 1/10; G01S 19/28
See application file for complete search history.

(56) References Cited

U.S. PATENT DOCUMENTS 5,428,358 A  6/1995  Gardner
5,761,095 A * 6/1998  Warren ................. E01C 19/004
                                                          702/166

(Continued)

FOREIGN PATENT DOCUMENTS

CN        106767383 A  *  5/2017  ............... G01B 7/26
DE        712 623 A2  * 12/2017  ............. G01S 19/54

OTHER PUBLICATIONS

Jacobson, Inferring Snow Water Equivalent for a Snow Covered Ground Reflector Using GPS Multipath Signals, Remote Sensing, 2010 (Year: 2010).*

*Primary Examiner* — Kyle R Quigley
(74) *Attorney, Agent, or Firm* — MacBride Law, PLLC; William L. MacBride, Jr.

(57) ABSTRACT

This method calculates snowpack parameters such as: snow water equivalent, snow liquid water content, snow depth and snow density, using Earth orbiting satellites from a GNSS constellation transmitting radio wave frequency carrier signals. An under-snow receiver system and an out-of-snow receiver system are employed are capable of decoding the encoded GNSS data into data products such as a carrier to noise ratios and carrier phases. A computer system receives data products. The Snowpack software programs derive a measured carrier to noise ration reduction from the carrier signals and the carrier to noise ratios. A physical model calculates a modeled excess phase and a modeled carrier noise ratio reduction, calculating measured snowpack parameters, such as: a snow water equivalent, a snow liquid water content, a snow depth, and a snow density, of the at least one snow layer. A non-linear mathematical solver adjusts the plurality of snow parameters.

11 Claims, 8 Drawing Sheets

(56) References Cited

U.S. PATENT DOCUMENTS

| | | | |
|---|---|---|---|
| 6,067,852 A | 5/2000 | Alber et al. | |
| 9,857,475 B2 | 1/2018 | Yunck | |
| 10,048,382 B2 | 8/2018 | Yunck | |
| 2019/0129066 A1* | 5/2019 | Dundorf | H04L 67/18 |
| 2019/0383967 A1* | 12/2019 | Polebitski | G01K 11/22 |

* cited by examiner

METHOD OF DETERMINING SNOWPACK PARAMETERS USING GLOBAL NAVIGATION SATELLITE SYSTEM RECEIVERS

CROSS-REFERENCE TO RELATED APPLICATIONS

This application claims priority from the provisional patent application filed Jan. 22, 2018, Application No. 62/620,369 and Confirmation Number 1710.

STATEMENT REGARDING FEDERALLY SPONSORED RESEARCH AND DEVELOPMENT

This invention was made with government support under a Small Business Innovative Research ("SBIR") award number 2016-33610-25361, awarded by the National Institute of Food and Agriculture ("NIFA"). The federal government has certain rights to the invention outlined in 37 CFR Part 401.14. These are incorporated by the SBIR award face sheet and the NIFA "Terms and Conditions for the SBIR grant program," dated April 2015.

FIELD OF THE INVENTION

The present invention relates generally to analyzing snowpack and making snowpack measurements of snow which is in place on the ground, or in situ. More specifically, but without limitation, the present invention relates to a method of analyzing, calculating and determining snow water equivalent ("SWE"), snow liquid water content ("LWC"), snow depth (also known and referenced as "snow height" and/or "snow thickness"), and snow density. These snowpack parameters can be measured for an entire snowpack or one or more layers that comprise the snowpack. The present invention utilizes signals from a Global Navigation Satellite System (GNSS, plural GNSSes) observed under the snowpack to determine the snowpack parameters listed above.

BACKGROUND OF THE INVENTION

The present invention is motivated by the global need for water conservation, and the need for new technologies to manage water on a watershed scale. Annual snowpack has been deviating from historical averages, with both observed decreases and increases (Easterling, et al. 2017). With these changes, more information pertaining to snowpack and its impact on the hydrologic cycle and available water resources is needed by agricultural producers, rural communities, power companies, municipalities, and many other industries.

Climate projections predict a more variable snowpack, decreased accumulation, and earlier spring melt (Easterling, et al. 2017). These projections are of particular importance in regions dependent on snowpack to meet human water needs. Snowpack is the major source of water in many regions of the world. Yearly snowpack variability can cause geographical regions that are not typically large contributors to rivers and streams to become large sources of runoff. For example, the record snowpack on the U.S. northern plains was a contributing factor to the Missouri River flooding that caused major economic damage in 2011 (Astifan, et al. 2012).

Current automated snowpack measurement systems are run by both governments and private companies. The United States Department of Agriculture ("USDA") Natural Resource Conservation Service ("NRCS") operates an automated network of snow measurement stations in the western United States called SNOTEL. The data collected from SNOTEL is used by this government agency and other agencies to issue streamflow forecasts for western watersheds. Many of these automated systems use snow pillows, snow scales, or gamma ray sensors for collecting such data, these systems are expensive to install and maintain (Stranden, Ree, and Moen. 2015).

The global navigation satellite system ("GNSS") industry operates several Earth orbiting installations, or constellations. Currently operating constellations include the U.S. Global Positioning System (GPS) and the Russian GLONASS satellite system, which have been joined by the Chinese BeiDou system, the European Union's Galileo system, Japan's Quai-Zenith Satellite System (QZSS), the Indian Regional Navigation Satellite System (IRNSS). These satellite constellations broadcast ephemeris data from which satellite positions can be calculated and timing reference code that can be used to calculate signal time of flight from each satellite to the receiver. A GNSS receiver converts the time of flight to a pseudorange distance measurement from the receiver to each satellite. From four or more pseudo-ranges, the receiver's location can be determined on the globe. While GNSS signals are primarily used for positioning navigation and timing, alternative applications have emerged. Of particular interest has been fixing or anchoring the GNSS ground receiver and using the errors or drifts in the signals over time to perform measurement of the receiver's environment.

The geodesy GNSS community operates fixed location GNSS ground stations throughout the world to study the Earth's crustal movement along with other geographic parameters. The fixed location GNSS receivers are often located in snowy locations, and some methods of quantifying and correcting the excess radio wave path lengths caused by snow cover have been derived and published (Kochanski. 2015). The method in Kochanski. 2015 discloses an apparent increase in the wave path length between a snow covered GNSS receiver and a non-snow measurement taken during the summer, to identify and remove the excess path error due to snow; however, it did not quantify the snow parameters required for meaningful snowpack monitoring.

The use of global positioning systems ("GPS") or GNSS signals to measure a satellite receiver's environment by reflectometry-based methods, such as observations under snowpack to determine snowpack parameters or properties, is well established both in scientific literature and the related art patents. The U.S. Pat. No. 5,428,358 to Gardner ("Gardner") discloses a method of using the GNSS group and phase path differences between two L-band radio wave path frequencies, L1 and L2 channels, to measure the local total electron content of the ionosphere, using a GNSS receiver to make a measurement of a physical property in the path of the waves between the receiver and the satellite. The United States Patent U.S. Pat. No. 6,067,852 to Alber et al. ("Alber") presents a method for measuring the GNSS timing errors due to water vapor in the troposphere, measuring a water vapor dependent excess path delay (equivalent to excess phase) and deriving the water vapor content of the atmosphere. The method in Alber discloses a double-differences phase or pseudo-range measurement from two or more GNSS receivers to isolate the excess timing error. The method of Alber corrects the excess phase integer ambiguities using multiple observations as a satellite passes overhead. However, neither Gardner nor Alber disclose the method of the present invention to determine an under-snow excessive phase, nor a method for determining all the parameters of snowpack as found in the present invention.

Much attention has been given to utilizing GNSS reflectometry (also referred to GNSS IR or GPS IR in the literature) to retrieve snow depth measurements. GNSS reflectometry observes GNSS signals at a receiver located above the snow. Changes to the GNSS signal caused by multipath interference between the signal reflected from the snow, and the direct signal can be used to derive less precise snow depth (Gutmann, et al. 2012; Larson, et al. 2009; Ozeki and Heki, 2012). A Carrier to Noise Density Ratio ("C/No") is measured as the satellite passes overhead; as the angle to the satellite changes so does the relative path difference between the direct and reflected signal dependent on the distance between the antenna and the reflecting surface. This leads to a periodicity in the C/No, which can be related to the accumulation of snow below the antenna. Measurements by such methods have demonstrated accuracies of snow depth in the order of centimeters of snow accumulation may be achieved (Ozeki and Heki 2012). Results have also shown that wet dense spring snows increase the reflected GNSS signal (Ozeki and Heki 2012). Within the GNSS-IR community, it has been discussed that if depth and the dielectric properties of the snow were known then a snow to water equivalent parameter ("SWE") and other snow properties might be measured (M. D. Jacobson 2008). Several groups have attempted to extend these methods to measure SWE (Mark D. Jacobson 2010; Larson et at 2009). However, to date, reflectometry methods have shown large uncertainties in SWE measurements, 50% or greater (Mark D Jacobson 2014), and do not disclose, teach or suggest the methods of the present invention.

In addition to reflectometry-based methods, researchers in related art have shown that the GNSS C/No observations can be used to directly measure a snow liquid water content ("LWC") (Koch, et at, 2014). The Japanese Patent JP2007212286A to Endo, et al ("Endo") describes a dual GNSS receiver apparatus used to measure the impact of snow on a GNSS signal, requiring either an assumption (but not a precise measurement) of snow density (Koch, et at 2014) or accepting a "wide spread" in the derived LWC. While this LWC measurement is of limited interest to the observer, the primary metric of importance to hydrologists forecasting water availability is the SWE, which is not accomplished or taught by this method (Sturm, et at 2010). None of the related published research or patents disclose, teach or suggest a method to measure SWE.

The present invention, however, uses signals from a GNSS satellite observations under the snowpack to accurately determine the SWE, LWC, snow depth, and snow density parameters of the snowpack, relying on the variation of the GNSS signals observed under the snowpack with satellite angle from zenith which is not disclosed or taught by Endo.

In contrast to these aforementioned methods, the method of the present invention precisely determines SWE in addition to LWC, snow density, and snow depth using signals as received by a GNSS receiver via an antenna located under the snowpack, without the requirement of a snowpack density assumption.

The work published in Europe by Koch et al. (Koch, et at 2017; Koch 2017; and Henkel et al. 2018) and the German Patents DE201710110992 and DE201710110994, both to Franziska Koch, Florin Appel, Wolfram Mauser and Patrick Henkel; related art, disclose methods and devices using a dual receiver with one receiver under the snow and one receiver above the snow, as in Endo. In this work, by observing both the differences in carrier phase and C/No between the two receivers over a plurality (used to refer to at least one) of satellites, the inventors disclose a method to determine both the excess phase and attenuation associated with the snow by applying a mathematical linear regression to the double-differenced excess phase over changing satellite elevation angles. The double-differenced excess phase is linearly dependent on the differentiated secants of the refracted signal angles in the snow. Since the refraction angles in the snow depend on the snow parameters, the refracted angles are unknown. The work does not explicitly disclose the method used to determine the refracted angles and seems to ignore refraction while assuming that the elevation angles of the GNSS signal in the snow are equivalent or approximately equivalent to the elevation angles of the satellites (see DE201710110994, section [0058]). This approximation can be used if the method is restricted to using only GNSS data observed at high satellite elevation angles. Under this condition, the linear regression can substitute the differentiated secant of the satellite angles from zenith for the differentiated secant of the refracted angles and provide an estimate for the excess phase at local zenith. Alternatively, the authors may be estimating the snow density and snow water content a priori which would allow the refracted angle of the GNSS signal to be estimated directly from the satellite elevation angle. In either case, the mathematical linear regression approximates the effective excess phase at the zenith (zenith angle of 0) and allows a simple solution to the integer ambiguity issue. This method approximately determines a zenith excess phase which directly relates to snow water equivalent (SWE) when the method application is restricted to the case of dry (liquid-free) snow. In the case of the wet snow, the SWE is not directly proportional to the excess phase. While the details are not disclosed clearly, their method uses carrier noise reduction to deduce the snow water content which allows them to apply a water-content dependent correction to the derived SWE. In contrast, the present invention uses a method not previously disclosed or described and is not restricted to assuming the snow density, to assuming the snow water content, or to using high-satellite elevation angle observations. The present method; which is not suggested, taught or disclosed by the prior or related art, uses a full physical model which accounts for the non-linear effects associated with refraction. With this model, the method uses a non-linear solver which directly finds all snow parameters including snow density and snow liquid content without approximation or restrictions on satellite geometry which are requisite when using a method based on linear regression.

None of the previous methods disclosed in prior patents or publications disclose a full, unambiguous characterization and measurement of SWE and these other properties in snowpack, as disclosed by the present invention.

The present invention discloses a method for deriving the snow height is used to determine SWE, snow density, and snow LWC along with both the real and imaginary components of the complex permittivity of one or more snow layers. The method of the present invention uses the differences (single and/or double) in the GNSS observables by a GNSS receiver below the snowpack and a receiver unaffected by the snow, while the snow impact on the GNSS observables (the desired snow parameters) are measured over a range of angles and time, and then uses measurements at all observed angles with a physics-based snowpack model and a non-linear solver to fully derive the snowpack attributes or parameters.

The patent and publication references described in the related, prior art do not disclose features of the present invention and would not be suitable for the required purpose of the present invention hereinafter described.

None of the references in the prior art contain every feature of the present invention, and none of these references in combination disclose, suggest or teach every feature of the present invention.

The foregoing and other objectives, advantages, aspects, and features of the present invention will be more fully understood and appreciated by those skilled in the art upon consideration of the detailed description of a preferred embodiment, presented below in conjunction with the accompanying drawings. Full citations to published works are found below.

SUMMARY OF THE INVENTION

A present invention is a method of analyzing snowpack that uses a GNSS constellation having an at least one Earth orbiting GNSS satellite uniquely positioned, transmitting a plurality of GNSS carrier signals through an Earth atmosphere, the plurality of GNSS carrier signals carrying encoded GNSS data. The method also uses a GNSS receiver capable of decoding the encoded GNSS data into a plurality of GNSS receiver data products such as a plurality of carrier to noise ratios, a plurality of carrier phases, a plurality of pseudo-ranges, raw ephemeris data, and a receiver clock data.

The method of the present invention employs an under-snow GNSS receiver system made of a measuring antenna and allows a snowpack to accumulate over the under-snow GNSS receiver system measuring antenna. The under-snow GNSS receiver system is connected to the GNSS receiver that utilizes a nearby data reference system. Attached to the under-snow GNSS receiver system and the data reference system is a computer system that receives the decoded plurality of GNSS receiver data products and, through the use of a plurality of computer communication protocols. The method provides the computer system with a plurality of snowpack software programs to store a time history of the plurality of GNSS receiver data products over a plurality of satellite angles, and, in one embodiment, uses the information from the GNSS receiver data products to determine a measured excess phase. The snowpack software programs are then used to derive a measured carrier to noise ration reduction from the plurality of GNSS carrier signals and the plurality of carrier to noise ratios. A physical model using at least one snow layer of a variable thickness within the snowpack is employed, calculating a modeled excess phase and a modeled carrier noise ratio reduction over the plurality of satellite angles from the zenith, and calculating a plurality of snowpack parameters, the plurality of snowpack parameters comprising: a snow water equivalent, a snow liquid water content, a snow depth, and a snow density, of the at least one snow layer. A non-linear mathematical solver within the plurality of snowpack software programs is used to adjust the plurality of snow parameters and minimize a minimum error between a measured excess phase and the modeled excess phase as well as the measured carrier to noise ratio reduction and the modeled carrier to noise ratio reduction by varying the snow water equivalent, the snow liquid water content, the snow depth, and recalculating the snow density of the at least one snow layer in the physical model until the minimum error is achieved.

The present invention uses the resulting snow water equivalent, the snow liquid water content, the snow depth, and the snow density of the at least one snow layer from the physical model describe the at least one snow layer. The plurality of snowpack parameters are analyzed respectively of the at least one snow layer to determine for the snowpack the snow depth, the snow water equivalent, and the snow liquid water content, and averaging the snow density of the snowpack, distributing the plurality of snowpack parameters within the snowpack.

In another embodiment of the method of analyzing snowpack of claim 1, the method further comprising: passing the plurality of snowpack parameters for the snowpack through a set of processing filters having a temporal plurality of snowpack parameters, respectively for the plurality of snowpack parameters.

Another embodiment provides the out-of-snow GNSS receiver system comprising: a reference antenna attached to a ground plane anchored to the known stationary Earth location and connected to the GNSS receiver; the out-of-snow GNSS receiver system receiving the plurality of GNSS carrier signals with encoded GNSS data not passing through the snowpack, and receiving the plurality of GNSS carrier signals within the at least one timeframe at the out-of-snow GNSS receiver system.

Another embodiment does not utilize excess phase by determining a measured carrier to noise ratio reduction, derived from applying the plurality of snowpack software programs from the plurality of GNSS carrier signals through the snowpack and the plurality of carrier to noise ratios from the under-snow GNSS receiver system and the data reference system, ultimately determining the plurality of measured snowpack parameters.

An embodiment of the present invention determines and measures certain snow attributes or parameters: snow water equivalent, snow liquid water content, snow depth, and snow density by acquiring GNSS observables using a GNSS receiver where an antenna is located underneath the snowpack (an under-snow receiver system) the method including: acquiring reference GNSS observables from a GNSS receiver system where another antenna is located above the snowpack (the reference system). The GNSS observables are acquired from one or more satellites in one or more GNSSes at one or more points in time. An excess phase associated with transmission of the GNSS signal through the snowpack is determined using at least one of a carrier phase and pseudo-range GNSS observables provided by the under-snow system and the reference system. A C/No reduction associated with interactions of the GNSS signal with the snowpack is determined using the C/No observables provided by the under-snow system and the reference system. A physical model with one or more snow layers of variable height is constructed which predicts the excess phase and C/No reduction associated with the snow where the SWE, LWC, snow depth, and snow density of each layer are the unknown quantities. The SWE, LWC, snow depth, snow density, and layer height quantities are solved for, by providing optimal agreement between the determined excess phase and C/No reduction. The total of the model layer heights is equivalent to the snow depth, the total of the model layer SWEs is the total SWE, and the average weighted by layer-height of the LWC of each layer is the average LWC of the snowpack. This data is passed through a set of processing filters that utilize knowledge of the snowpack parameters and how they are allowed to change in time to improve the snow attributes.

An alternative embodiment omits the excess phase and constructs the physical model does, solving for the SWE, LWC, snow depth, and snow density by not including or utilizing the excess phase. The C/No observables acquired by the reference system are exchanged for modeled reference C/No observables. The modeled reference C/No observables are comprised of one or more of the following: filtered or unfiltered observations from one or more GNSS receiver systems, including but limited to observations collected by the under-snow receiver system when under snow-free conditions; prior known GNSS spacecraft transmission signal levels; a model of troposphere extinction; and a model of the ionosphere extinction.

The present invention is more economical and easier to install than existing snowpack measurement systems. This invention will allow for a larger number of snowpack measurement stations to be installed throughout the world. This would allow hydrologists to have a higher spatial sampling of snowpack, which would improve streamflow forecasts.

The aforementioned features, objectives, aspects and advantages of the present invention, and further objectives and advantages of the invention, will become apparent from a consideration of the drawings and ensuing description.

BRIEF DESCRIPTION OF THE DRAWINGS

The foregoing features and other aspects of the present invention are explained, and other features and objects of the present invention will become apparent in the following detailed descriptions, taken in conjunction with the accompanying drawings. However, the drawings are provided for purposes of illustration only, and are not intended as a definition of the limits of the invention. Acronyms are defined above.

FIG. 1A illustrates in one embodiment of the present invention, a partial, blown up elevational view and schematic of the under-snow GNSS receiver system in FIG. 1, comprising a measuring antenna, at a stationary Earth location, a ground plane, a GNSS receiver, and computer system.

ACRONYMS USED IN THE APPLICATION

C/No—carrier to noise ratios
GHz—means 1,000,000 cycles per second as a measurement of radio frequencies of wireless network communications.
320 GNSS—means one of the global navigation satellite systems, space-based navigation systems that provides location and time information. GNSS satellites broadcast signals to enable GNSS receivers on or near the Earth's surface to determine location and time. GNSS signals include ranging signals used to measure the distance to the satellite, and navigation messages, including ephemeris data used to calculate the position of each satellite in orbit and information about the time and status of the entire satellite GNSS constellation.
GPS—means the Global Positioning System, a GNSS system operated by the US Department of Defense.
L1, L2 and L5—mean GPS carrier signal frequencies available for civilian use.
LWC—snow liquid water content.
QZSS—Japan's Quasi-Zenith Satellite System
SWE—snow water equivalent.
UART, RS-232—a digital communication standard for receiving a sequence of bits at specific voltage levels.

DETAILED DESCRIPTION

Figure 1:
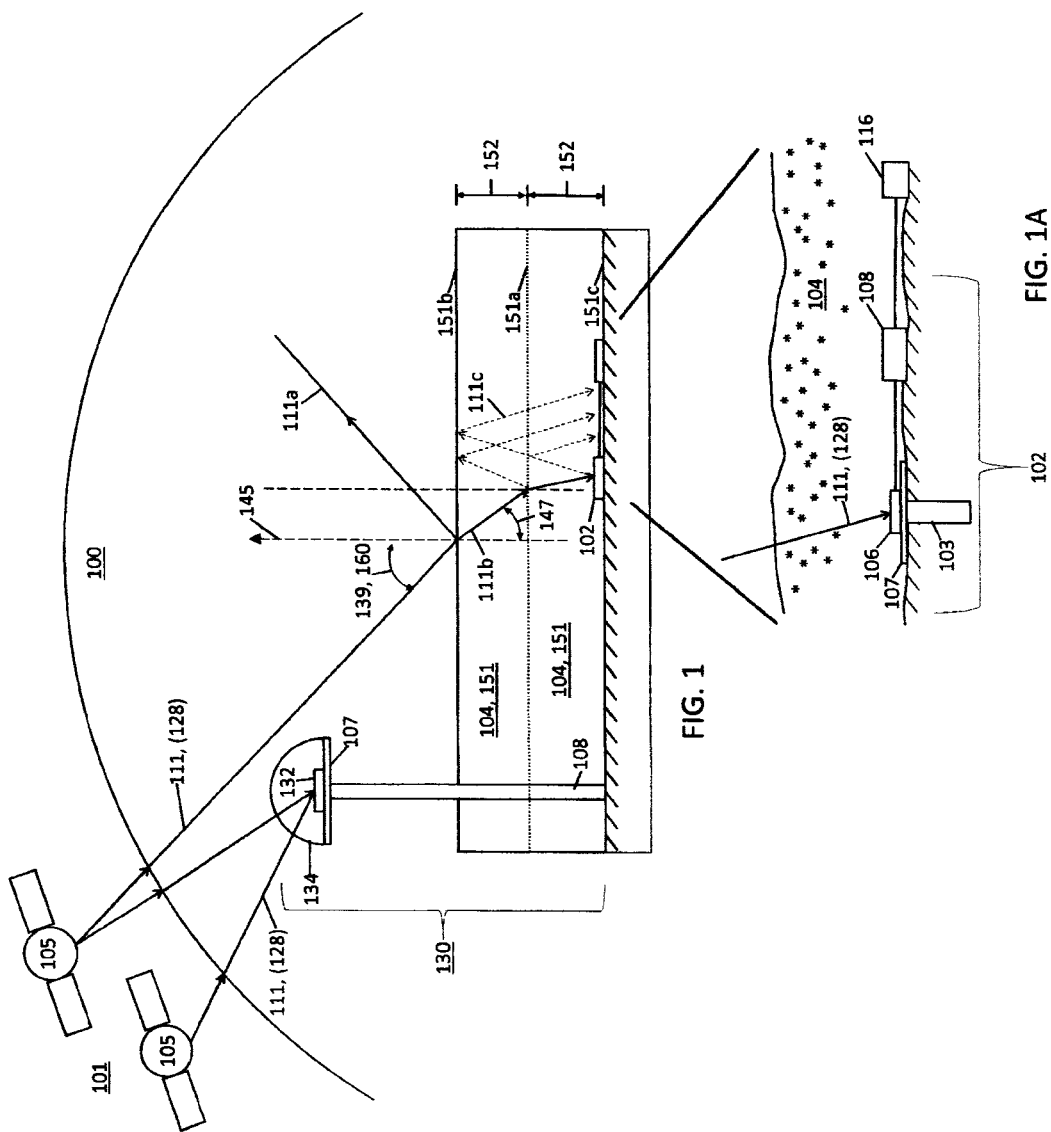
FIG. 1 illustrates in one embodiment of the present invention, an elevational view and schematic of the physical installation of an under-snow GNSS receiver system installed so that it is covered by a snowpack, and a data reference system that may be co-located, for receiving a plurality of GNSS carrier signals.

The present invention will now be described more fully hereinafter with references to the accompanying drawings, in which the preferred embodiment of the invention is shown. This invention, however, may be embodied in different forms, and should not be construed as limited to the embodiments set forth herein. Rather, the illustrative embodiments are provided so that this disclosure will be thorough and complete, and will fully convey the scope of the invention to those skilled in the art. It should be noted, and will be appreciated, that numerous variations may be made within the scope of this invention without departing from the principle of this invention and without sacrificing its chief advantages. Like numbers refer to like elements throughout. A representative number of certain repeated elements are labeled in the drawings. Acronyms are defined above unless otherwise set forth. The present invention relates to a method of analyzing, calculating and determining plurality of snowpack parameters 136, such as: SWE, LWC, snow depth (also known and referenced as "snow height" and/or "snow thickness") 136c, and snow density. These parameters are determined with the use of a GNSS constellation. Turning now in detail to the drawings in accordance with one embodiment of the present invention, for a method of analyzing certain plurality of snowpack parameters 136, FIG. 1 depicts an elevation view and schematic of one embodiment of the present invention, the method comprised of utilizing a GNSS constellation 101, commonly known in the industry as a particular set of Earth orbiting satellites routinely utilized in a number of matters, having in this embodiment at least one Earth orbiting GNSS satellite 105, uniquely positioned, transmitting a plurality of GNSS carrier signals 111 (used to refer to at least one), with encoded GNSS data 128, through the Earth atmosphere 100, while employing an under-snow GNSS receiver system 102. Note that each of the at least one Earth orbiting GNSS satellite 105 is uniquely positioned, meaning each transmits from a unique location and the satellite's signal has a unique wave incidence angle 139 at the measuring antenna 106. The plurality of GNSS carrier signals 111 (used to refer to at least one) transmitted by at least one Earth orbiting GNSS satellite 105 included without limitation one or more frequency bands in use by one or more constellations. Currently GNSS use frequencies in the 1.1 GHz to 1.6 GHz range.

The method in one embodiment utilizes the GNSS constellation 101 having an at least one Earth orbiting GNSS satellite 105 uniquely positioned and transmits the plurality of GNSS carrier signals 111 through the Earth atmosphere 100, the plurality of GNSS carrier signals 111 carrying encoded GNSS data 128 comprising: a coded timing reference 128c, and a satellite ephemeris 128a.

Figure 2:
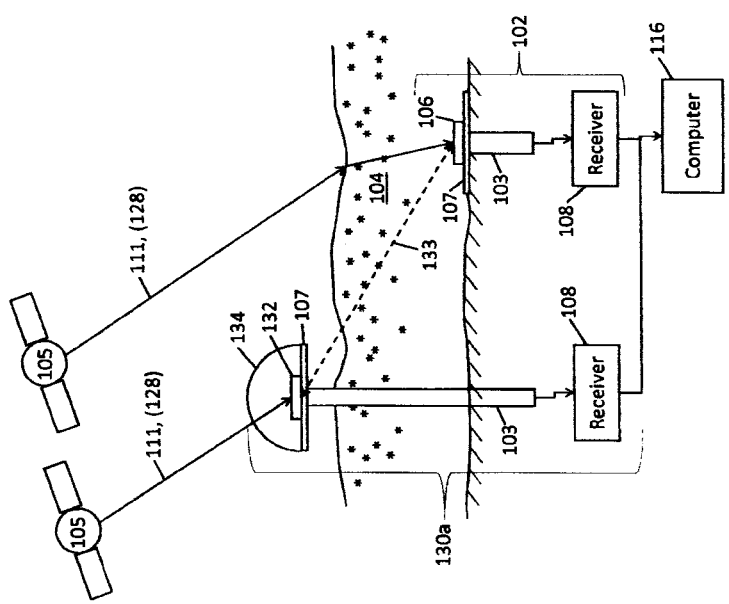
FIG. 2 illustrates in one embodiment of the present invention, an elevational view and schematic showing the separation of the under-snow GNSS receiver system and the out-of-snow GNSS receiver system.
Figure 3:
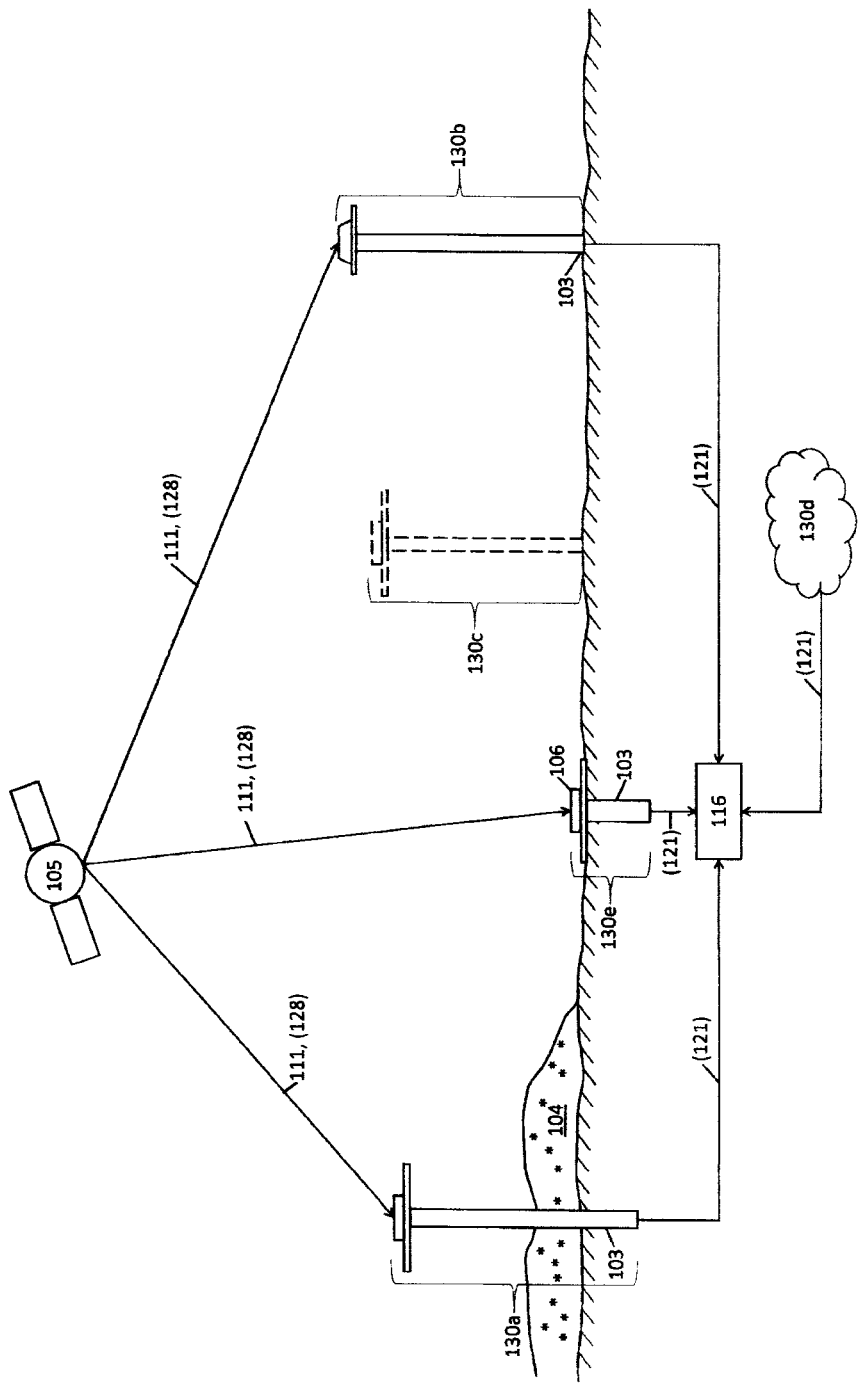
FIG. 3 illustrates in alternative embodiments of the present invention, elevational views and schematics for different types of data reference systems.
Figure 4:
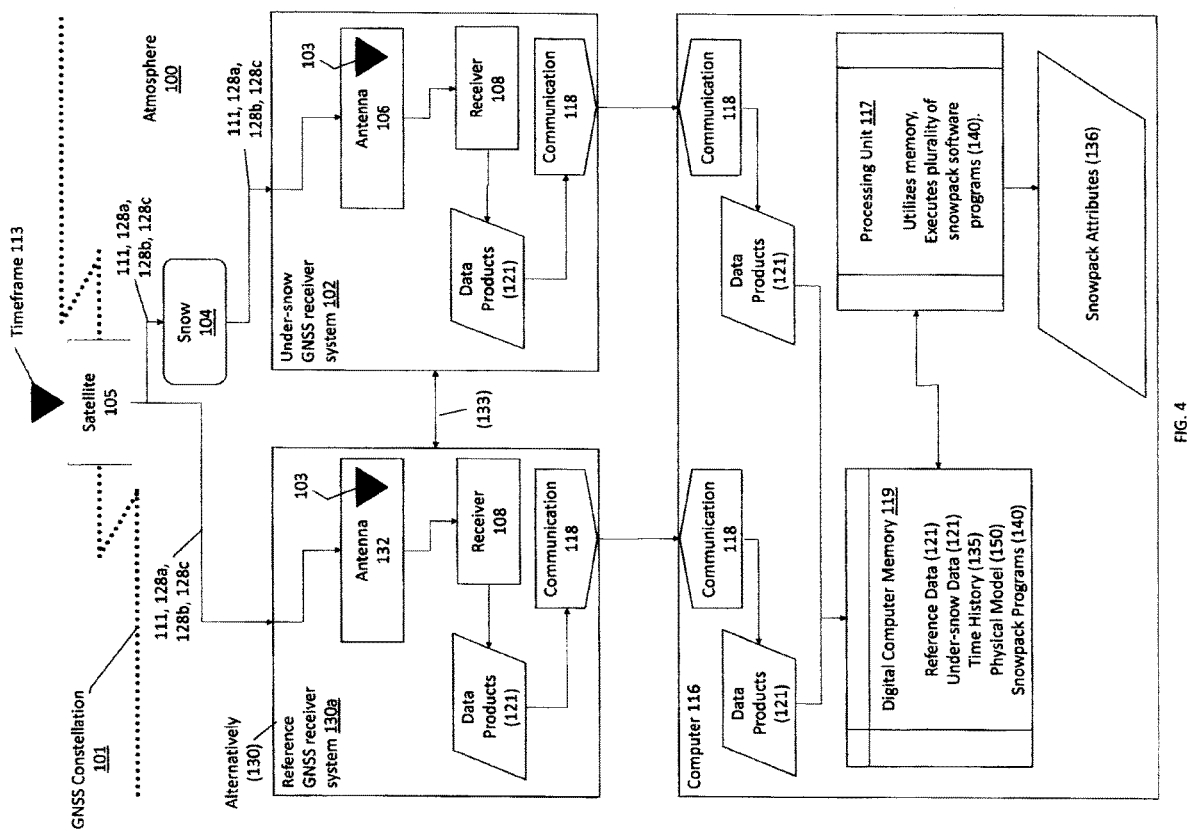
FIG. 4 illustrates a schematic of a portion of one embodiment of the present invention, depicting a flowchart of the processing of a plurality of encoded GNSS data products emanating from at least one Earth orbiting GNSS satellites, the method resulting in determination of a plurality of measured snowpack parameters. A symbol, ▼, represents a stationary Earth location and a timeframe; the ▼ symbol indicating a singular position and time for receiving certain of the plurality of GNSS carrier signals and encoded GNSS data by the GNSS receiver.

The present invention employs industry standard GNSS receivers 108 depicted in FIGS. 1A and 4. The plurality of GNSS carrier signals 111 and a plurality of encoded GNSS data 128 is collected by a measuring antenna 106 or 132 and received at each GNSS receiver 108, as depicted in FIGS. 1-3. The GNSS receiver 108 filters, decodes, and processes the plurality of GNSS carrier signals 111 and a plurality of encoded GNSS data 128, using methods commonly known in the industry, into a plurality of GNSS receiver observables or data products 121. These observables defined herein as a plurality of GNSS receiver data products 121 comprise: a plurality of carrier to noise ratios 121a, a plurality of carrier phases 121b, a plurality of pseudo-ranges 121c, a plurality of doppler frequency shifts 121d, raw ephemeris data 121e, and receiver clock data 121f. The invention in alternative embodiments may utilize a GPS L1 frequency-only GNSS receiver 108, or multiple carrier frequency/multiple GNSS constellation GNSS receivers 108.

One embodiment of the present invention, depicted in FIGS. 1 and 2, the GNSS receiver 108 reads carrier phase 121b and carrier to noise ratio 121a at a wave incidence angle 139, or angles of incidence (shown in FIG. 8), to the plurality of GNSS carrier signals 111. This embodiment uses the plurality of GNSS carrier signals 111 from the GNSS constellation 101. These signals experience moderate absorption from the snowpack 104. At plurality of GNSS carrier signal 111 frequencies, the snowpack 104 has a snow index of refraction in the snowpack 136f (see FIG. 8) high enough to cause an observable phase delay, or single and/or double differenced excess phase 141. The imaginary component of the snow index of refraction in the snowpack 136f is sufficiently low to allowing transmission of the plurality of GNSS carrier signals 111 into deep snow and at a higher wave incidence angle 139. At GNSS carrier signal frequencies, solid ice and liquid water have very different interactions with the plurality of GNSS carrier signals 111 allowing for the differentiation of ice and liquid water in the snowpack 104.

FIG. 1 in one embodiment of the present invention depicts the various effects on the plurality of GNSS carrier signals 111 including the air-snow interface reflection of carrier signals 111a due to the snow-air interface 151b, the snow refracted carrier signal 111b due to the snow-air interface 151b, and the carrier signal reflections internal to snowpack 111c due to at least one potential layer boundary 151b including the snow-ground interface 151c. These reflections and/or refractions of the plurality of GNSS carrier signals 111 occur at a layer boundary 151a due to a change in a snow density 136d which is also a change in the index of refraction in the snowpack 136f for at least one snowpack layer 151. The embodiment measures the carrier to noise ratio 121a and the carrier phase 121b for the wave incidence angle 139, shown in FIGS. 1 and 8, coming from the plurality of GNSS carrier signals 111.

While GNSS is used in one embodiment of the present invention, depicted in FIG. 1, the method of the present invention in alternative embodiments can employ alternative sources of electromagnetic or radio wave signals, or alternative signal receiving devices, as commonly known in the industry, to provide for measurements of both the amplitude and the phase of the plurality of radio wave carrier signals over a range of known incident angles within the snowpack 104. The receiving device would be required to provide measurement of both the amplitude and the phase of the plurality of radio wave carrier signals at each of their, known wave incidence angles 139, in FIG. 8.

The under-snow GNSS receiver system 102, the GNSS receiver 108, data reference system 130 and the out-of-snow GNSS receiver system 130a referenced herein are all commonly known GNSS receivers and systems used in this industry, capable of receiving satellite transmitted radio waves, such as those produced by Trimble, OriginGPS, NVS Technologies AG, Swift Navigation, and many others.

As depicted in FIG. 1A, the under-snow GNSS receiver system 102 comprises an anchored measuring antenna 106, a ground plane 107 and a GNSS receiver 108, all of which is equipment commonly used in this industry. The ground plane 107 is a metal plate, ground plate or other conducting plane. The ground plane 107 and the anchored measuring antenna 106 are locate on a stationary Earth location 103. FIGS. 1, 1A and 3. The GNSS receiver 108 may have the anchored measuring antenna 106 built in or may accommodate a separate measuring antenna 106 attached through an analog or digital communication line as depicted in FIG. 1A. An embodiment employs the under-snow GNSS receiver system 102 which comprises the measuring antenna 106 attached to the ground plane 107 and anchored to the stationary Earth location 103. The under-snow GNSS receiver system 102 connected to the GNSS receiver 108;

The under-snow GNSS receiver system 102 depicted in FIGS. 1 and 1A acquires or receives from at least one Earth orbiting GNSS satellite 105 the plurality of GNSS carrier signals 111 transmitting from at least one GNSS satellite 105 in at least one GNSS constellation 101. The GNSS constellation 101 may be one of a number of GNSS constellations or satellite systems currently employed as satellites orbiting the Earth, transmitting radio waves, including the U.S. Global Positioning System (GPS), the Russian GLONASS satellite system, the Chinese BeiDou system, the European Union's Galileo system, Japan's Quai-Zenith Satellite System (QZSS), the Indian Regional Navigation Satellite System (IRNSS), and other emerging satellite constellations to perform differing navigational tasks in various environments or for various uses.

One embodiment of the present invention, shown in FIGS. 1 and 1A, utilizes the GNSS constellation 101, the under-snow GNSS receiver system 102, a standard GNSS receiver equipment, and a computer system 116. GNSS satellite systems are typically comprised of, as understood herein, and used in embodiments of the invention, a GNSS constellation 101 of mid earth orbit, at least one Earth orbiting GNSS satellite 105 that transmit the plurality of GNSS carrier signals 111, with precise code timing reference 128c and satellite ephemeris data 128a encoded or encoded onto the carrier signals (FIG. 4). Other radio wave signals from similar satellite systems, as noted above, could be used in alternative embodiments of the invention, provided that at least one Earth orbiting satellite 105 is positioned in an orbit that allows it to pass across the sky above a stationary Earth location 103, and accurate satellite ephemeris information is available.

Figure 5:
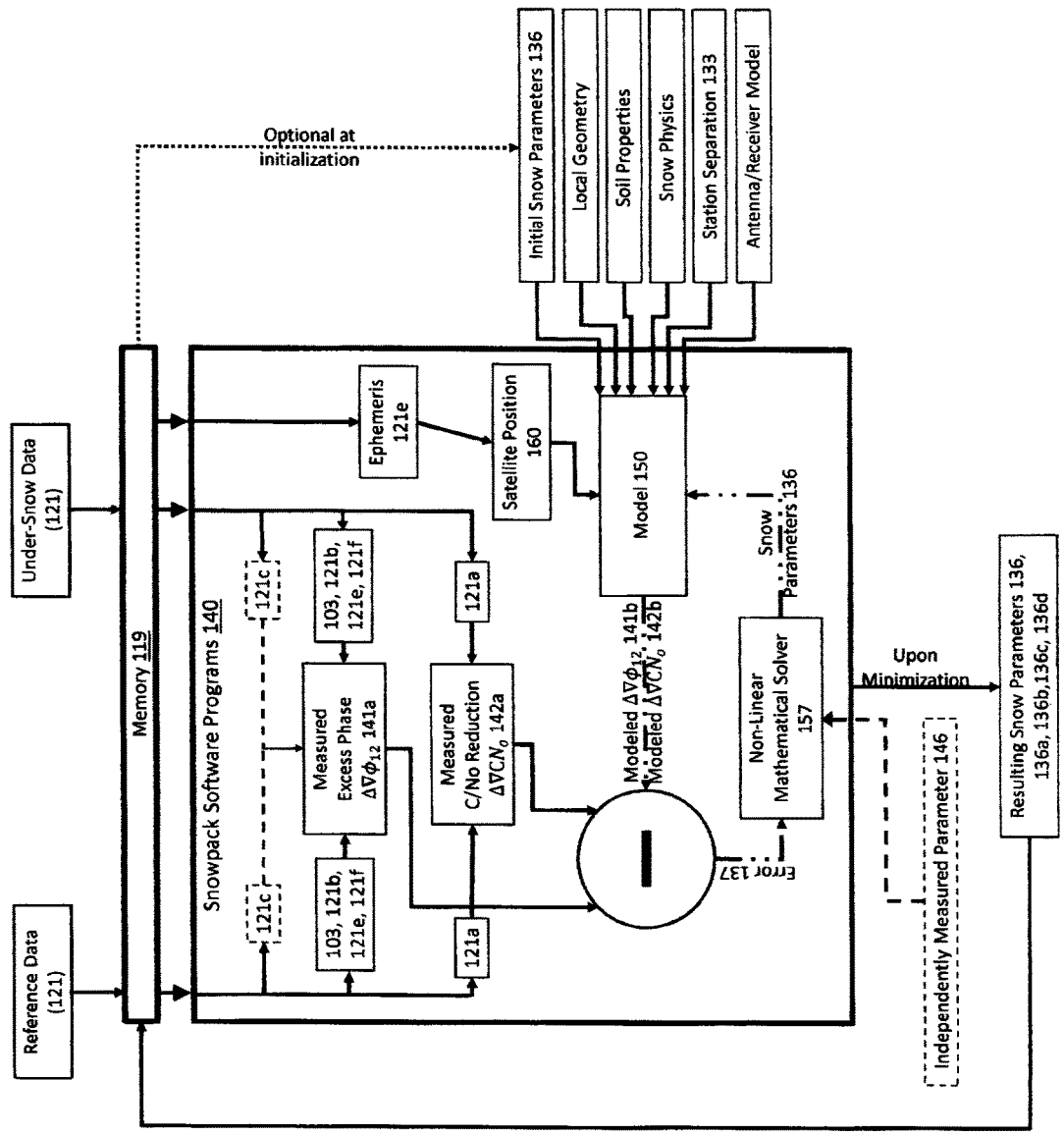
FIG. 5 illustrates in one embodiment of the present invention, a flowchart of the method used to derive a plurality of snowpack parameters, using both carrier to noise ratio reduction and/or excess phase, creating a physical model, and using a non-linear mathematical solver and physical model to reproduce impact of the snowpack on GNSS observables, i.e., carrier to noise ratio reduction and/or excess phase from the at least one Earth orbiting GNSS satellite.

One embodiment of the present invention employs the computer system 116, FIGS. 4-5, attached to the under-snow GNSS receiver system 102 and to the data reference system 130 to receive the plurality of GNSS receiver data products 121 decoded by the respective under-snow GNSS receiver system 102 and the data reference system 130. The computer system 116 has a plurality of computer communication protocols 118 to receive the plurality of GNSS receiver data products 121, a digital computer memory 119 storing the plurality of GNSS receiver data products 121, a processing unit 117 to process the plurality of GNSS receiver data products 121, and a plurality of snowpack software programs 140.

The present invention needs only one GNSS carrier frequency to be implemented; however, multiple frequencies are used in GNSS constellations (i.e., L1, L2, L5 frequencies) and could be used in alternative embodiments of the invention to reduce measurement uncertainty and improve plurality of snowpack parameters 136 measurement accuracy. The method of the present invention requires that the plurality of GNSS carrier signals 111 transmit simultaneously from at least one Earth orbiting GNSS satellite 105.

The under-snow GNSS receiver system 102, the pillory measuring device in this embodiment of the present invention, depicted in FIGS. 1 and 1A, is used to receive the plurality of GNSS carrier signals 111 transmitted from at least one earth orbiting satellite 105. The under-snow GNSS receiver system 102, the measurement device, is positioned on the stationary Earth location 103 of the Earth to allow a snowpack 104 to accumulate above it and over the under-snow GNSS receiver system 102 measuring antenna 106. The anchored measuring antenna 106 is anchored, to the stationary Earth location 103 on the Earth so its Earth based position does not change. In alternative embodiments the anchored measuring antenna 106 or an anchored reference antenna 132, further described below, may be "anchored" in the sense that their positions are known precisely, if not physically anchored.

As depicted in the schematic of FIG. 4, as well as FIG. 2, the computer system 116 in the present invention is used to retrieve the necessary data from the under-snow GNSS receiver system 102 and a data reference system 130 discussed below, to store a time history of a plurality of GNSS receiver data products 121 from both the under-snow GNSS receiver system 102 and the data reference system 130 over a plurality of angles from the zenith 160, process that data into snowpack parameters or properties, and output the plurality of snowpack parameters 136 to a user or user's computer system. The stationary Earth location 103 is located and identified for the under-snow GNSS receiver system 102 and the data reference system 130;

As depicted in the schematic of FIGS. 4 and 5, the computer system 116 consists of standard devices commonly known and found in modern computers commonly used in this industry, including: at least one of a plurality of computer communication protocols 118 (i.e. UARTS, RS-232, ethernet or other commonly used protocols or proprietary protocols), a processing unit 117 (the electronic circuitry used in these computers to carry out computer program instructions), digital computer memory 119 for data, software programs, and for running programs and processing data. The computer system 116 must be able to run the plurality of snowpack software programs 140, process plurality of GNSS receiver data products 121 (plurality of carrier phase 121b and plurality of carrier to noise ratio 121a over a specified timeframe 113 in one embodiment of the present invention), compute a plurality of snowpack parameters 136, and output the computed plurality of snowpack measured parameters 136 to a user. The plurality of snowpack software programs 140 could be one compiled executable program that consists of many sub-routines, functions, and classes that are commonly used program structures in computer programing. The embodiment Receives the plurality of GNSS carrier signals 111 having encoded GNSS data 128 within the at least one timeframe 113 at both the under-snow GNSS receiver system 102 and the data reference system 130.

The method of the present invention in one embodiment utilizes one or more GNSS receiver systems, the under-snow GNSS receiver system 102 and an out-of-snow GNSS receiver system 130a (a data reference system 130 in this embodiment (shown in FIG. 1), or the under-snow GNSS receiver system 102 by itself when uncovered from the snowpack 104, or other data reference system 130, as alternatively discussed below and depicted in FIG. 3). The under-snow GNSS receiver system 102 is comprised of, as noted above, at least, an antenna (the anchored measuring antenna 106) and a receiver (the GNSS receiver 108) with the necessary capability of deriving the required GNSS observables (the plurality of GNSS receiver data products 121) from the received signal (the plurality of GNSS carrier signals 111 and encoded GNSS data 128 from at least one Earth orbiting GNSS satellite 105), as these elements shown in the schematic of FIGS. 1-5. The anchored measuring antenna 106 is underneath the snowpack 104 to observe GNSS signals (the plurality of GNSS carrier signals 111 and encoded GNSS data 128 from at least one Earth orbiting GNSS satellite 105) under the snowpack 104. In addition, the second GNSS receiver system, the out-of-snow GNSS receiver system 130a, with a non-snow-covered antenna, the anchored reference antenna 132, is utilized to observe the plurality of GNSS carrier signals 111 and encoded GNSS data 128 from at least one Earth orbiting GNSS satellite 105 above the snowpack 104, as depicted in FIGS. 1-3. This data reference system 130 used in one embodiment provides signal observations (the plurality of GNSS receiver data products 121). These observables can be combined with the observables from the under-snow GNSS receiver system 102 to correct for errors contained in the plurality of GNSS carrier signals 111. These errors are corrected in this embodiment of the present invention, as further calculated below, to isolate the changes due to the snowpack 104.

The method of the present invention further comprises having the data reference system 130 comprise the out-of-snow GNSS receiver system 130a having a reference antenna 132 attached to a ground plane 107 anchored to the known stationary Earth location 103 and connected to the GNSS receiver 108. The out-of-snow GNSS receiver system 130a receives the plurality of GNSS carrier signals 111 with encoded GNSS data 128 not passing through the snowpack 104, and provides the plurality of GNSS receiver data products 121 to the computer system 116. The plurality of GNSS carrier signals 111 are received within the at least one timeframe 113 at the out-of-snow GNSS receiver system 130a.

Alternative embodiments of the present invention provide for the data reference system 130 comprising an at least one of a nearby dissimilar out-of-snow GNSS receiver system 130b, a network RTK station 130c, or a modeled reference station calculated from precise ephemeris troposphere and ionosphere data 130d, shown in FIG. 1

The present invention in one embodiment, depicted in FIG. 1, uses the under-snow GNSS receiver system 102 connected to the anchored measuring antenna 106 that is underneath the snowpack 104 to observe the plurality of GNSS carrier signals 111, the GNSS constellation 101 signals, under the snowpack 104. In addition, a second GNSS receiver connected to a non-snow-covered anchored reference antenna 132, the out-of-snow GNSS receiver system 130a in this embodiment, is utilized to observe GNSS signals, the plurality of GNSS carrier signals 111, above the snowpack 104, as the data reference system 130. The data reference system 130 provides observations that allows for GNSS signal errors to be corrected and to isolate only the changes in such signals due to the snowpack 104.

Shown in FIGS. 1 and 4, the under-snow GNSS receiver system 102 is located on the stationary Earth location 103 under the snowpack 104 for receiving the plurality of GNSS carrier signals 111 and encoded GNSS data 128 from at least one earth orbiting satellite 105.

The present invention in one embodiment also employs locating the data reference system 130, depicted in FIGS. 1, 1A and 2, the data reference system 130 having an out-of-snow GNSS receiver system 130a on the stationary Earth location 103 out from under the snowpack 104 for receiving the plurality of GNSS carrier signals 111 that are not passing through snowpack 104, and receiving the plurality of GNSS carrier signals 111 within at least one timeframe 113 at the out-of-snow GNSS receiver system 130a. The out-of-snow GNSS receiver system 130a comprises the anchored reference antenna 132, the ground plane 107 and the GNSS receiver 108.

In one embodiment of the present invention, the anchored reference antenna 132 to the out-of-snow GNSS receiver system 130a is covered with a dome or other structure made from material transparent to the frequencies of the GNSS carrier signals to facilitate snow shedding. Snow on the reference antenna 132 would introduce error into the reference system. The hydrophobic radome 134 may be one of a physical cover 134a, such as a dome on the anchored reference antenna 132, as depicted in FIG. 2. The hydrophobic radome 134 may be covered with a surface coating 134b to improve snow shedding.

The data reference system 130 provides data that indicates what the measured GNSS signal (or other electromagnetic signal) measurements would be if they had not passed through the snowpack 104. One embodiment of the present invention uses a standard GNSS receiver system, the out-of-snow GNSS receiver system 130a, discussed above and shown in FIGS. 1-2, that is essentially identical to the measurement device, the under-snow GNSS receiver system 102. However, the anchored reference antenna 132 of the out-of-snow GNSS receiver system 130a is positioned to not allow snow to build up on it. This data reference system's 130 anchoring reference antenna 132 is covered with the hydrophobic radome 134, as noted above, facilitating snow shedding.

The position of the data reference system's 130 anchored reference antenna 132 and the position of the anchored measuring antenna 106 must be known with the separation distance between the anchored reference antenna 132 and the anchored measuring antenna 106 known precisely, as shown in FIGS. 2 and 4. In one embodiment of the present invention, the anchored reference antenna 132 is anchored to the stationary Earth location 103 on the Earth, i.e., the ground, so that its Earth based position does not change. The separation distance 133 must be small enough to ensure that the errors present in the plurality of GNSS receiver data products 121 caused by the ionosphere 100a and troposphere 100b are similar in the under-snow GNSS receiver system 102 and the data reference system 130. This is achieved by locating the anchored reference antenna 132 to be relatively near the anchored measuring antenna 106. In an alternative embodiment of the present invention, the anchored reference antenna 132 is as far as 300 kilometers from the anchored measuring antenna 106.

Alternatively in other embodiments, the plurality of GNSS carrier signals 111 for the data reference system 130, shown in FIGS. 1-5, may be received or acquired: (1) from a nearby dissimilar out-of-snow GNSS receiver system 130b or the under-snow GNSS receiver system 102 when neither is covered by snow, (2) from a network-connected real or virtual reference receiver wherein the virtual reference station provides plurality of pseudo-range 121c, plurality of carrier phases 121b, and plurality of carrier to noise ratios 121a derived from a network of reference stations a network reference stations (defined herein as network RTK station 130c), (3) modeled reference station calculated from precise ephemeris, troposphere, and ionosphere data 130d, (4) from a time shifted self-reference 130e from data collected by the anchored measuring antenna 106 when it was not covered by snow, (5) or any combination of thereof, as these alternative elements are variously depicted in FIG. 3. Precise ephemeris data is provided to the general public by the National Oceanic and Atmospheric Administration from accurate and timely GPS satellite ephemerides ("orbits"), using 24-hour data segments from the global GPS network coordinated by the International Geodynamics GPS Service.

As noted, one embodiment of the present invention uses the plurality of GNSS carrier signals 111 received from the under-snow GNSS receiver system 102 under the snowpack 104 to important parameters of the snowpack 104, relying on the GNSS constellation 101 and uses the plurality of GNSS carrier signals 111 transmitted into the snowpack 104 (see FIG. 1). This embodiment receives the plurality of GNSS carrier signals 111 within at least one timeframe 113 at the under-snow GNSS receiver system 102, as generally depicted in FIGS. 1 and 4.

In the method of the present invention, the GNSS receiver 108 for both the under-snow GNSS receiver systems 102 and the out-of-snow GNSS receiver system 130a receive the plurality of GNSS carrier signals 111 during at least one timeframe 113, denoted in FIG. 4 by a ▼, representing, as appropriate, both a singular position, a stationary Earth location 103, and time, the at least one timeframe 113, for receipt of certain of the plurality of GNSS carrier signals 111 by each of the GNSS receiver 108. A time history 135 of the plurality of GNSS receiver data products 121 is stored within the computer system 116, as depicted in FIG. 4. The plurality of snowpack software programs 140 and digital computer memory 119 are employed to store a time history 135 of the plurality of GNSS receiver data products 121 over a plurality of satellite angles from a zenith 160 from both the under-snow GNSS receiver system 102 and the data reference system 130.

Changes in the received GNSS constellation 101 plurality of GNSS carrier signals 111 associated with their transmission through the snowpack 104 and the variation in these plurality of GNSS carrier signals 111 caused by changes to GNSS satellite orbiting geometry as the at least one Earth orbiting satellite orbits above the Earth atmosphere 100 are observed, including without limitation, the plurality of GNSS receiver data products 121 comprising: the plurality of carrier to noise ratios 121a, the plurality of carrier phases 121b, the plurality of pseudo-ranges 121c, the plurality of doppler frequency shifts 121d, the raw ephemeris data 121e, and receiver clock data 121f, all from the encoded GNSS data 128, as utilized in FIG. 4. These changes to the plurality of GNSS carrier signals 111 attributed to snowpack 104 allow the plurality of snowpack parameters 136 or properties to be observed. The observed plurality of snowpack parameters 136, processed from the plurality of standard GNSS data products 121 as calculated by the method of the present invention and include (and first defined above): the SWE 136a, the LWC 136b, the snow depth 136c, and the snow density 136d.

It is understood in the applied science of this industry, as electromagnetic signals propagate through a medium, they experience a signal delay associated with the reduced speed through the material as compared to transmission through a vacuum. This magnitude of this effect per unit length is quantized by the index of refraction of the material. In addition, scattering and attenuation in the material causes a reduction in the signal strength. The present invention is a method to derive the aforementioned plurality of snowpack parameters 136 by observing these physical phenomena as affecting the plurality of GNSS carrier signals 111 from at least one Earth orbiting GNSS satellite 105 transmitted through the snowpack 104, and received by an anchored measuring antenna 106, attached to a GNSS receiver 108 in the present invention, as shown in FIGS. 1-3.

As the plurality of GNSS carrier signals 111 transect the layer boundary 151a of the at least one snow layer 151, the speed of the plurality of GNSS carrier signals 111 is reduced or attenuated, as shown in FIG. 1, impacting a plurality of carrier to noise ratios 121a, further discussed below. As compared to a plurality of GNSS carrier signal 111 transmitted through Earth atmosphere 100, the plurality of GNSS carrier signal 111 is delayed, which is referred to in one embodiment of the present invention as an excess phase 141 (see FIGS. 1 and 8) and is measured as a distance, typically in units of meters. The excess phase 141 is derived from the speed of wave propagation, which will be slower in the snowpack 104. The delay or excess phase 141 in the plurality of GNSS carrier signals 111 through the at least one snow layer 151 of the snowpack 104 is a function of the SWE 136a, the LWC 136b, and the snow depth 136c. In addition to a delay, the signal level of the plurality of GNSS carrier signals 111 is reduced as it transverses the layer boundary 151a at the snow-air interface 151b (FIG. 1), and as it transmits through the snowpack 104, dependent on the amount of liquid water in the snowpack 104, the LWC 136b. Multipath interference from wave paths, including but not limited to reflection from the snow-ground interface 151c, the snow-air interlace 151b, or other layer boundaries 151a, as they are depicted in FIG. 1, also affects the signal level of the plurality of GNSS carrier signals 111. In addition, the effects on the plurality of GNSS carrier signals 111 are dependent on the geometry of each at least one Earth orbiting GNSS satellite 105 in a GNSS constellation 101 and on each ground-based, GNSS receiver 108.

The additional information provided by observing the plurality of GNSS carrier signals 111 for different elevation and azimuth angles of at least one Earth orbiting GNSS satellite 105 constrains the allowable set of plurality of snowpack parameters 136 that can result in the observed changes to the plurality of GNSS carrier signals 111. This constraint allows a non-linear mathematical solver 157 (FIG. 7) to find the plurality of snowpack parameters 136 from the observed changes in the plurality of GNSS carrier signals 111 using the physical model 150 of the plurality of GNSS carrier signals 111 transecting the snowpack 104. The non-linear mathematical solver 157 is employed within the plurality of snowpack software programs 140 to adjust the plurality of measured snow parameters 136 and minimize a minimum error 137 between a measured excess phase 141a and the modeled excess phase 141b as well as the measured carrier to noise ratio reduction 142a and the modeled carrier to noise ratio reduction 142b. This is accomplished with the non-linear mathematical solver 157 this by varying the snow water equivalent 136a, the snow liquid water content 136b, the snow depth 136c, and recalculating the snow density 136d of the at least one snow layer 151 in the physical model 150 until the minimum error 137 is achieved.

The physical model 150 is constructed using at least one snow layer 151 of a variable thickness 152, shown in FIG. 1, within the snowpack 104. A measured carrier to noise ratio reduction 142a, is derived from applying the plurality of snowpack software programs 140 from the plurality of GNSS carrier signals 111 through the snowpack 104 and the plurality of carrier to noise ratios 121a from the under-snow GNSS receiver system 102 and the data reference system 130. The physical model 150 is employed in the plurality of snowpack software programs 140 to calculate a modeled excess phase 141b and a modeled carrier noise ratio reduction 142b over the plurality of satellite angles from the zenith 160, and to calculate a measured plurality of snowpack parameters 136. The measured plurality of snowpack parameters 136 comprise the snow water equivalent 136a, the snow liquid water content 136b, the snow depth 136c, and the snow density 136d, of the at least one snow layer 151.

In an embodiment of the present invention, the physical model 150 is employed to a plurality of snowpack software programs 140, for calculating and predicting the modeled excess phase 141b and a modeled carrier to noise ratio reduction 142b associated with the snowpack 104 where the SWE 136a, the LWC 136b, the snow depth 136c, and the snow density 136d of the at least one snow layer 151 are unknown. The snowpack 104 may alternatively be characterized by the snow complex permittivity 136e and the snow depth 136c of the at least one snow layer 151. The plurality of snowpack software programs 140, as depicted in FIGS. 4-7, are certain software programs used to calculate the SWE 136*a*, the LWC 136*b*, the snow depth 136*c*, and the snow density 136*d* of the at least one snow layer 151. The SWE 136*a*, the LWC 136*b*, the snow depth 136*c*, and the snow density 136*d* of each of the at least one snow layer 151 are properly combined to determine the plurality of measured snowpack properties 136 for the snowpack 104. These parameters may also be used to analyze the respective parameter distribution within the snowpack 104. The measured plurality of snowpack parameters 136 are analyzed for each of the at least one snow layer 151 to determine for the snowpack 104 the snow depth 136*c*, the snow water equivalent 136*a*, and the snow liquid water content 136*b*, and averaging the snow density 136*d* of the snowpack 104 and for calculating and distributing the measured plurality of snowpack parameters 136 within the snowpack 104.

The processing unit 117 is the electronic circuitry within the computer system 116, generally depicted in FIGS. 2 and 3, that carry out the instructions of the computer programming by performing the basic arithmetic, logic, controlling, and input/output (I/O) operations specified by the programming instructions of the plurality of snowpack software programs 140. This device may be any processing unit capable of carrying out the instructions, these include without limitation the central processing unit of the computer, a graphical processing unit, co-processor, a field programmable gate array, and embedded micro-processor.

Plurality of Snowpack Parameters Determination

In one embodiment of the method of the present invention, the method creates a modeled plurality of carrier to noise ratios 121*a*, comprising at least one of the plurality of carrier to noise ratios 121*a* collected by the under-snow GNSS receiver system 102 not under the snowpack 104, the plurality of GNSS carrier signals 111 from a prior known GNSS constellation 101. The plurality of carrier to noise ratios 121*a* are measured by the under-snow GNSS receiver system 102 and the out-of-snow GNSS receiver system 130*a* to determine the carrier to noise ratio reduction 142, single and/or double differenced, associated with the snowpack 104 interacting with the under-snow GNSS receiver system 102. In order to derive the measured carrier to noise ratio reduction or change 142*a* (hereinafter in Equation 1, "ΔCNo") associated with the interaction of the plurality of GNSS carrier signals 111 with the snowpack 104, the plurality of carrier to noise ratios 121*a*, measured by the data reference system 130 is compared to the plurality of carrier to noise ratio 121*a* measured by the under-snow GNSS receiver system 102. In Equation 1, the single difference process depicted in FIGS. 4 and 5, $CNo_r$ denotes the plurality of carrier to noise ratio 121*a* of the data reference system 130 and $CNo_u$ denotes the plurality of carrier to noise ratio 121*a* of the under-snow GNSS receiver system 102. In Equation 2, the double difference measured carrier to noise ratio reduction 142*a* is calculated as depicted in FIGS. 4 and 5, $CNo_{r1}$ denotes the plurality of carrier to noise ratio 121*a* of the data reference system 130 for satellite 1 and $CNo_{u1}$ denotes the plurality of carrier to noise ratio 121*a* of the under-snow GNSS receiver system 102 for satellite 1 $CNo_{r2}$ denotes the plurality of carrier to noise ratio 121*a* of the data reference system 130 for satellite 2 and $CNo_{u2}$ denotes the plurality of carrier to noise ratio 121*a* of the under-snow GNSS receiver system 102 for satellite 2. The double difference designated by $\Delta \nabla$ can be used to cancel signal biases cause by antenna de-tuning or other effects in one or both of the under-snow and reference receivers.

$$\Delta CNo = CNo_r - CNo_u \quad \text{Equation (1):}$$

$$\Delta \nabla CNo_{12} = (CNo_{r1} - CNo_{u1}) - (CNo_{r2} - CNo_{u2}) \quad \text{Equation (2):}$$

For at least one Earth orbiting GNSS satellite 105 to the GNSS constellation 101, s below in Equations 2 and 3, and for each radio wave frequency received from the plurality of GNSS carrier signals 111, in this embodiment of the method again applied as depicted in FIGS. 4 and 5; each GNSS receiver 108 reports the observed distances between at least one Earth orbiting GNSS satellite 105 and each GNSS receiver 108. These observed distances are denoted in Equations 2 and 3 as the code pseudo-range $P^s$ (plurality of pseudo-ranges 121*c*); and the carrier phase $\varphi^s$ (plurality of carrier phases 121*b*). Each of said observed distances is derived from the observed time of travel of the plurality of GNSS carrier signals 111 from at least one Earth orbiting GNSS satellite 105 to the out-of-snow GNSS receiver system 130*a*.

Equations 2 and 3, depicted in FIG. 4, and applied in this embodiment of the method of the present invention, model the observed distances and include and includes several physical effects and error sources.

$$P^s = \rho + c(dt - dT^s) + I^s + T^s + br_P + \varepsilon_P^s \quad \text{Equation (3):}$$

$$\varphi^s = \rho + c(dt - dT^s) + I^s + T^s + br_\varphi + b_\varphi + N\lambda + \varepsilon_\varphi^s \quad \text{Equations (4):}$$

ρ is the geometric range between at least one Earth orbiting GNSS satellite 105 and the under-snow GNSS receiver system 102;

c is the speed of light.

dt and $dT^s$ are the clock bias differences of the at least one Earth orbiting GNSS satellite 105 and the under-snow GNSS receiver system 102, respectively;

$I^s$ the ionospheric delay to the particularly utilized at least one Earth orbiting GNSS satellite 105;

$T^s$ is the tropospheric delay to the particularly utilized at least one Earth orbiting GNSS satellite 105;

$br_P$ and $br_\varphi$ are the anchored measuring antenna 106 and hardware biases of the under-snow GNSS receiver system 102;

$b_P$ and $b_\varphi$ are the hardware biases to at least one Earth orbiting GNSS satellite 105;

N is the carrier phase ambiguity (discussed below);

λ is the wavelength of the plurality of GNSS carrier signals 111 in the Earth atmosphere 100; and $\varepsilon_P$ and $\varepsilon_\varphi$ are measurement noise in the code and measurements of the plurality of carrier phases 121*b*.

The above equations also describe the method of the present invention having an out-of-snow GNSS receiver system 130*a* located above the Earth atmosphere 100, for the various alternatives for the data reference system 130 in alternative embodiments the present invention.

The measured excess phase 141*a* in the plurality of GNSS carrier signal 111 is caused to occur in one embodiment of the method of the present invention between the plurality of GNSS carrier signals 111 passing through the snowpack 104 and the plurality of GNSS carrier signals 111 not passing through the snowpack 104. The measured excess phase 141*a* is determined in an embodiment of the present invention using the plurality of snowpack software programs 140 deriving from the plurality of GNSS carrier signals 111 through the snowpack 104 at the stationary Earth location 103 to the respective GNSS receiver 108. The plurality of GNSS receiver data products 121 are utilized from both the under-snow GNSS receiver system 102 and the data reference system 130. The GNSS receiver data products 121 comprise at least one of the plurality of carrier phases 121b, the plurality of the pseudo-ranges 121c, the raw ephemeris data 121e or the receiver clock data 121f.

To begin to address the excess phase 141, a set of equations is derived for the under-snow GNSS receiver system 102 with a constant snow depth 136c, where, in Equations 4 and 5, the U denotes the under-snow GNSS receiver system 102, S is the excess phase 141 of the snowpack 104, dependent on the geometry of at least one Earth orbiting GNSS satellite 105 and on the snowpack 104. A satellite wave incidence angle 139 shown in FIG. 8 of the at least one Earth orbiting GNSS satellite 105 is $\theta_s$ and an azimuth is $\varphi_s$. When evaluated for each at least one Earth orbiting GNSS satellite 105 and the under-snow GNSS receiver system 102, the following Equations create a system of equations to be solved for the delay in the excess phase 141 in the snowpack 104:

$$P_U^s = \rho_U + c(dt_U - dT^s) + I^s + T^s + bU_P + b_P + S(\theta_s, \phi_s)_s + \varepsilon_P^s \quad \text{Equation (5)}$$

$$\varphi_U^s = \rho_U + c(dt_U - dT^s) + I^s + T^s + bU_\phi + b_\phi + N\lambda + S(\theta_s, \phi_s)_s + \varepsilon_\phi^s \quad \text{Equation (6)}$$

Equations 1-5 still contain a set of errors, $T^s$, $br_P$, $br_\phi$, $b_P$, $b_\phi$, N, $\varepsilon_P$, and $\varepsilon_\phi$, all described above. These errors must be corrected to provide accurate plurality of measured snowpack parameter 136 measurements. A commonly accepted means used to cancel atmospheric and hardware effects, utilized in this embodiment of the present method is to employ the so called "double differencing" technique, referenced above. First, the plurality of pseudo-ranges 121c observed at each of the under-snow GNSS receiver system 102 and the out-of-snow GNSS receiver system 130a (by each, respective GNSS receiver 108) are measured for at least one Earth orbiting GNSS satellite 105. For at least one Earth orbiting GNSS satellite 105, a "single" difference is calculated as the difference between the code pseudo-ranges measured at the data reference system 130 and the under-snow GNSS receiver system 102. See FIGS. 1-4. The single difference cancels delay due to the ionospheric 100a and the troposphere 100b and satellite hardware and clock differences. The formulation for a single Earth satellite is shown in equations 6 and 7 where $\Delta$ denotes the single difference operation.

$$\Delta P = \Delta \rho + c \Delta dt + \Delta b_P + S(\theta_s, \phi_s) + \Delta \varepsilon_P^s \quad \text{Equation (7):}$$

$$\Delta \phi^s = \Delta \rho + c \Delta dt + \Delta b_\phi + \Delta N\lambda + S(\theta_s, \phi_s) + \Delta \varepsilon_\phi^s \quad \text{Equation (8):}$$

To cancel these errors for each satellite pair, two single-differences for at least one Earth orbiting GNSS satellite 105 (arbitrarily enumerated by subscripts 1 and 2 in Equations 8 and 9 below) are subtracted to create the "double-difference". The double-difference removes the receiver clock and hardware biases. This method is applied to the data reference system 130 and the under-snow GNSS receiver system 102, shown in FIGS. 1-4, by the following set of equations derived where $\Delta \nabla$ denotes the double difference operation. These equations are free of bias terms.

$$\Delta \nabla P_{12} = \Delta \nabla \rho_{12} + S(\theta_{s1}, \phi_{s1}) - S(\theta_{s2}, \phi_{s2}) + \varepsilon_{\Delta \nabla P} \quad \text{Equation (9):}$$

$$\Delta \nabla \phi_{12} = \Delta \nabla \rho_{12} + \Delta \nabla N\lambda + S(\theta_{s1}, \phi_{s1}) - S(\theta_{s2}, \phi_{s2}) + \varepsilon_{\Delta \nabla \phi} \quad \text{Equation (10)}$$

If the location of each antenna is known and the positions of at least two unique satellites each being at least one Earth orbiting GNSS satellite 105 in FIGS. 1-4 can be calculated from raw ephemeris data 121e, the only unknowns in Equation 8 are the $\Delta \nabla P_{12}$. The noise ($\varepsilon_{\Delta \nabla P}$) in the double-differenced code pseudo-range observation is on the order of a meter, so it will not give a precise estimation of the excess phase 141 unless long term averaging is used. The double differenced measured excess phase 141a is much more accurate and has a similar form (Equation 9) but has an additional integer ambiguity term. The plurality of GNSS frequency carrier signals 111 are periodic; therefore, each GNSS receiver 108 can report the plurality of carrier phases 121b that is an integer number of wavelengths away from the true value. This is manifested as the double-difference integer ambiguity, $\Delta \nabla N\lambda$, in Equation 9 where N is any realistic integer value. This means that several theoretical solutions can exist to Equation 9. The double-differenced code pseudo-range, Equation 8, can be used to constrain the values of N that can realistically solve the Equation.

Figure 7:
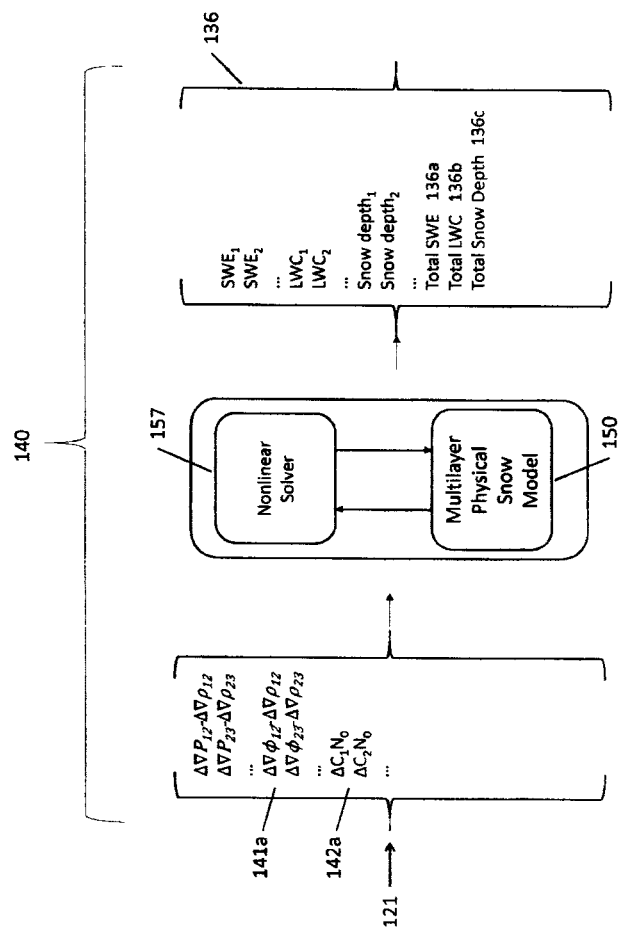
FIG. 7 illustrates in one embodiment of the present invention, a schematic depicting the method of using a non-linear mathematical solver to take GNSS receiver data products, deriving a measured excess phase and measured carrier to noise ratio reduction and solve for the plurality of snowpack parameters using the physical model (also whiled a multilayer physical snow model or a snowpack GNSS propagation model).

Since the double difference integer ambiguity is constant during the overpass of any of the at least one Earth orbiting GNSS satellite 105, shown in FIG. 1, while the effects of the snowpack 104 on the plurality of GNSS receiver data products 121 change with the geometry of at least one Earth orbiting GNSS satellite 105, the double differenced integer ambiguity can be resolved simultaneously with the plurality of snowpack parameters 136 within the non-linear mathematical solver 157 shown in FIG. 7. Triple-differencing, or a difference between two double differences calculated for two unique satellite angle sets for at least two unique satellites each being at least one Earth orbiting GNSS satellite 105, can also be used in alternative embodiments to remove the integer ambiguity.

A Description of the Excess Phase Due to Snow

To provide a better understanding of how the non-linear mathematical solver 157 of FIGS. 5 and. 7 can derive the plurality of snowpack parameters 136 using the modeled excess phase 141b, the following section provides a detailed description to one embodiment of the present invention calculating the modeled excess phase 141b, and determining how it varies with plurality of snowpack parameters 136 and with the wave incidence angle 139. For the sake of simplicity, it has been assumed in this embodiment, that the snowpack 104 is a uniform plane, and that dependence on azimuth angle of the at least one Earth orbiting GNSS satellite 105 can be ignored. An alternative embodiment having a non-symmetrical snowpack 104 will be addressed later in this description. Using this assumption of azimuthal symmetry, the geometry of the under-snow GNSS receiver system 102, depicted in FIG. 1-3 and at least one Earth orbiting GNSS satellite 105 is in this embodiment described by FIG. 8.

Figure 8:
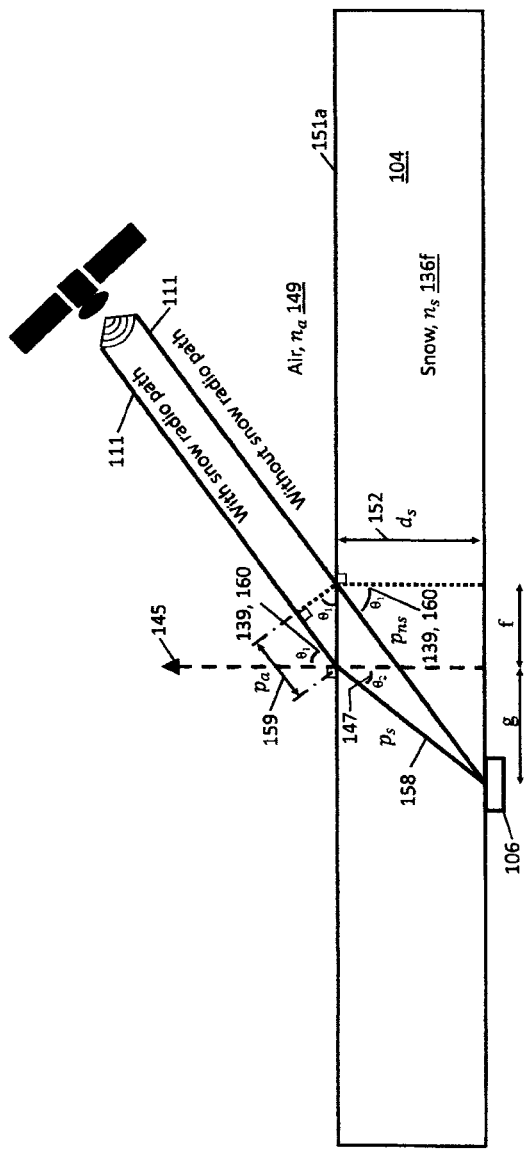
FIG. 8 illustrates in one embodiment of the present invention, an elevational view and schematic of the under-snow GNSS receiver system, the snowpack, and at least one Earth orbiting GNSS satellite 105, while providing the geometric terms that lead to a description of the excess phase.

When a radio wave (or any electromagnetic) signal interacts with the snowpack 104, it is slowed down by the snowpack 104 in FIG. 1. Furthermore, when interacting with the surface, the snow-air interface 151b, of the snowpack 104 at the wave incidence angle 139, not normal to that surface, the wave front or phase front bends (refracts). This signal refraction causes the particular signal to be impacted by the snowpack 104 and to take a different angle of propagation in the snowpack 147, than a signal not impacted by the snow, as shown in FIG. 8. An angle of propagation inside the snowpack 147, represented mathematically as $\theta_2$, can be calculated from the angle outside the snowpack, the wave incidence angle 139 represented mathematically as $\theta_1$, via Snell's law; and the index of refraction in the snowpack 136f, $n_s$, and outside the snowpack 104, the index of refraction in air 149, $n_a$ where $n_s$ and $n_a$ are the real portions of a potentially complex index of refraction.

$$n_a \sin \theta_1 = n_s \sin \theta_2 \quad \text{Equation (11):}$$

In practice $n_a$ is assumed to be 1, and $\theta_1$ is calculated from satellite transmitted raw ephemeris data 121e or precise ephemeris and from knowledge of the location of the GNSS receiver 108. This is a new path 158 that each of the plurality of GNSS carrier signals 111 take through the snowpack 104, in FIG. 8, with the speed of travel through the snowpack 104 leads to the excess phase 141 in the under-snow GNSS receiver system 102. The signal path becomes a combination of both, $p_s$, the new path 158 in the snowpack 104, and $p_a$ the added path 159 that each of the plurality of GNSS carrier signals 111 must travel through air before intersecting the snowpack 104.

$p_s$ can be described by the angle of propagation in the snowpack 147, $\theta_2$, and the depth of the snow $d_s$, the variable thickness 152, shown in FIG. 8.

$$p_s = \frac{d_s}{\cos\theta_2} \qquad \text{Equation (12)}$$

Using Snell's law to calculate $\theta_2$ $$\theta_2 = \sin^{-1}\left(\frac{\sin\theta_1}{n_s}\right) \qquad \text{Equation (13)}$$

Then $$p_s = \frac{d_s}{\cos\left(\sin^{-1}\left(\frac{\sin\theta_1}{n_s}\right)\right)} \qquad \text{Equation (14)}$$

This is the physical path length that each of the plurality of GNSS carrier signals 111 take through the snowpack 104, but since it is slowed down by the index of refraction of the snowpack 104, the effective path length in the snowpack 104, $t_1$, is:

$$t_1 = \frac{n_s d_s}{\cos\left(\sin^{-1}\left(\frac{\sin\theta_1}{n_s}\right)\right)} \qquad \text{Equation (15)}$$

The extra propagation path through air due to the bending in the snowpack 104, $p_a$, the added path 159, needs to be calculated and can be found using the triangles described by the sides $d_s$ $(g+f)p_{ns}$ and $d_s g p_s$, and can be shown to be:

$$p_a = d_s \sin\theta_1 (\tan\theta_1 - \tan\theta_2) \qquad \text{Equation (16):}$$

The total propagation path due to the snow is the combination of these two terms:

$$t_s = \frac{n_s d_s}{\cos(\theta_2)} + d_s \sin\theta_1 (\tan\theta_1 - \tan\theta_2) \qquad \text{Equation (17)}$$

The excess phase 141, in terms of distance, is then equal to the difference of a snow free travel path and $t_s$, which can be given the term $\Delta t$ and described by $$\Delta t = \frac{n_s d_s}{\cos(\theta_2)} + d_s \sin\theta_1 (\tan\theta_1 - \tan\theta_2) - d_s \sec\theta_1 \qquad \text{Equation (18)}$$

When the equation for $\theta_2$, the angle of propagation inside the snowpack 147 is inserted then this equation becomes:

$$\Delta t = \frac{n_s d_s}{\cos\left(\sin^{-1}\left(\frac{\sin\theta_1}{n_s}\right)\right)} + \qquad \text{Equation (19)}$$
$$d_s \sin\theta_1 \left(\tan\theta_1 - \tan\left(\sin^{-1}\left(\frac{\sin\theta_1}{n_s}\right)\right)\right) - d_s \sec\theta_1$$

This function has units of distance and can be converted to cycles by dividing by the wavelength of the one of the plurality of GNSS carrier signals 111, this function is now equivalent to the excess phase 141, the term $S(\theta_s, \phi_s)$, with the assumption that the snowpack 104 is symmetric and uniform with $\phi_s$ then:

$$S(\theta_s) = \frac{1}{\lambda}\left[\frac{n_s d_s}{\cos\left(\sin^{-1}\left(\frac{\sin\theta_1}{n_s}\right)\right)} + \right. \qquad \text{Equation (20)}$$
$$\left. d_s \sin\theta_1 \left(\tan\theta_1 - \tan\left(\sin^{-1}\left(\frac{\sin\theta_1}{n_s}\right)\right)\right) - d_s \sec\theta_1 \right]$$

which now becomes an equation dependent only on two unknowns $n_s$, the snow index of refraction, and $d_s$, the snows variable thickness 152. In general, snowpack 104 has a complex permittivity (index of refraction), where $n_s$ is the real part of the index, $\kappa_s$ is the imaginary component of the index, and j is the imaginary number equal to $\sqrt{-1}$.

$$n^* = n_s + j\kappa_s \qquad \text{Equation (21):}$$

However, the imaginary term $\kappa_s$ describes the attenuation in the snowpack 104 and has no effect on refraction or propagation speed through the snowpack 104, and therefore the imaginary component can be dropped when analyzing the excess phase 141.

Non-Planar, Non-Symmetric Snowpack

Figure 2A:
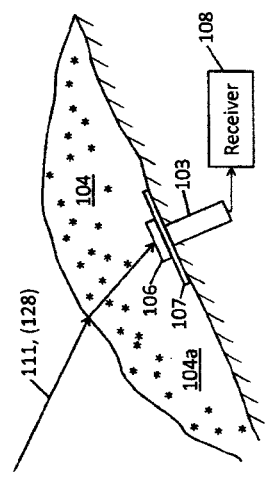
FIG. 2A illustrates in one embodiment of the present invention, an elevational view of the under-snow GNSS receiver system located on a ground slope.

The simplest non-planer snowpack 104 is a snowpack 104 on sloped ground 104a such as a mountain side or building roof, depicted in FIG. 2A. In this alternative embodiment, the wave incidence angle 139 to the plurality of GNSS carrier signals 111 can be projected to the normal of the slope and the problem becomes the same as the planer snowpack 104.

The most complicated case, in another embodiment, is the snowpack 104 that is not a uniform plane and no longer has azimuthal symmetry in the snow depth 136c, the snow density 136d, or water distribution. In this embodiment, the values for the $\theta_s$ and $\phi_s$ dependent terms in FIG. 8 and the equations set forth in the section above entitled A Description of the Excess Phase Due to Snow, are added to $d_s$ (the variable thickness 152 of the snowpack 104) and $n_s$ (the index of refraction of the snow) in the non-linear mathematical solver 157. The solution for excess phase 141 follows a tomography-like method.

A Description of the Physics-Based Snow Model

The plurality of snowpack parameters 136 can be derived on a per layer basis for each of the at least one snow layer 151, by modeling the snowpack 104 as consisting of multiple variable-depth homogenous layers or as a single homogeneous layer, in alternative embodiments of the present invention. In either embodiment, the snow-air interface 151b above the snowpack 104 and a snow-ground interface 151c below must be included in the physical model 150. The SWE 136a of the entire snowpack 104, the mean LWC 136b for the snowpack 104, and the snow depth 136c can be derived directly from the per layer quantities of the at least one snow layer 151 using well known relationships including summation and weighted averaging.

The derivation of the plurality of snowpack parameters 136 relies on a multilayer dielectric model for a generic snowpack 104. This physical model 150, shown in FIG. 5, is used to simulate the propagation of the plurality of GNSS carrier signals 111 through multiple at least one snow layer 151 with the snow density 136d being variable, the snow depth 136c, and liquid water content 136b. The dielectric constants for the physical model 150 are based on accepted, aggregated research done on snow by a variety of groups (Frolov and Macheret 1999; Koch et al. 2014). While this embodiment of the physical model 150 requires specific values for these constants, there is currently a wide variability within values reported by the community, and new research reporting these values will only improve this model and the resulting derived snow parameters; however, a specific value is not fundamental to the way this embodiment of the physical model 150 is implemented in this embodiment. Similarly, multiple models exist for use with other embodiments for the imaginary part of the dielectric coefficient of water. The Debye equation is one such model of the imaginary part of the dielectric coefficient of water, which is a driving factor of the determination of the LWC 136b in the snowpack 104. Inputs to the physical model 150 are the LWC 136b, the snow density 136d for dry snow, and snow depth 136c for at least one snow layer 151. From these values, a complex index of refraction is calculated for each at least one snow layer 151 in the multilayer physical model 150 for the snowpack 104.

The complex index of refraction is used in the present invention to calculate Fresnel coefficients at each bi-layer interface, i.e., the layer boundary 151a, and produce a value for reflection and transmission. Since the index of refraction on both sides of the interface of the layer boundary 151a is complex, proper handling of a lossy medium is necessary (Canning 2011). In the method of the present invention it is assumed: (1) that across the layer boundary 151a there is conservation of energy in terms of transmission and reflection, and (2) that loss/attenuation occurs in the bulk of the material, such as the snowpack 104. The at least one snow layer 151 cause multiple reflections and transmissions through several differing at least one snow layer 151 of snowpack 104 and at the snow-ground interface 151c. To handle this phenomenon, the method of the present invention uses a transfer theory to obtain transmission through a slab of snow, the at least one snow layer 151 consisting of multiple different dielectric layers (Katsidis and Siapkas 2002) while taking into account phase interferences. The snow propagating physical model 150 in this embodiment needs to consider the coupling efficacy of the plurality of GNSS carrier signals 111 between the measuring antenna 106 and snow. The ground soil is reflective and absorptive causing a snow-ground interface 151c that will vary depending on soil type, structure, and water content (Dobson et al. 1985), and is a parameter that is considered in the physical model 150 of alternative embodiments.

The physical model 150 in alternative embodiments can be modified to work with the various frequencies of GNSS constellation 101 or other satellite networks. To adapt to a new frequency for such alternative embodiments, the only change is the complex index of refraction for the snowpack 136f and the soil, and the modeling of the snow-antenna interface.

Description of the Non-Linear Mathematical Solver

A non-linear system is any system which the output is not directly proportional to the input. The natural system being modeled by the present invention is non-linear, exemplified in that the snow density 136d and LWC 136b appear in higher order teens than linear in the conversion between snow density 136d and LWC 136b to index of refraction in the snowpack 136f, and trigonometric terms are prevalent in the mathematical descriptions of excess phase 141, as well as the interference terms that appear in the carrier to noise ratio reductions 142. A dedicated non-linear mathematical solver 157 may exist for certain classes of related attribute determination problems for the snowpack 104, but in this embodiment the non-linear mathematical solver 157, shown in FIG. 7, of a general nature is used. The non-linear mathematical solver 157 minimizes a difference between a model, as in the present invention and a real-world problem with measured data. The physical model 150 (described previously) has, at least but not limited to, the variable thickness 152 of the snowpack 104, the snow density 136d of dry snow, and the LWC 136b, as model parameters, shown as "Snow Parameters 136" in FIG. 5. An equivalent set of model parameters would be the variable thickness 152 of the snowpack 104 and a complex index of refraction in the snowpack 1361 shown in FIG. 8. Using these model parameters and the physical model 150, an expected solution is computed. This solution is compared to measured data in a figure-of-merit function (or simply merit function). This The magnitude of the merit function is, by convention, small when the agreement between the model data and measured data is good. The non-linear mathematical solver 157 minimizes this merit function magnitude by varying the input parameters. Some examples of non-linear mathematical solvers known in the industry are the Levenberg-Marquardt algorithm, the Nelder-Mead method, variations on Newton's method and Quasi-Newton methods, various genetic algorithms, and particle swarms, pattern searches (or direct search), and variations of these.

The Method with Excess Phase

In the embodiment of the method of the present invention as set forth above, both measured excess phase 141a (as derived using one or more of the double differenced plurality of carrier phases 121b and plurality of pseudo-ranges 121c between the plurality of the under-snow GNSS receiver system 102 and the data reference system 130 observations) and the measured carrier to noise ratio reduction 142a (as derived from under-snow C/No 121a observations minus reference C/No 121a observations) are used to derive the plurality of snowpack parameters 136. The measured excess phase 141a and measured carrier to noise ratio reduction 142a, and their variation with satellite geometry, are used to derive the LWC 136b, the SWE 136a, the snow depth 136c and the snow density 136d. The physics-based snow, the physical model 150 (FIG. 5) and a non-linear mathematical solver 157 (FIG. 7) are used to constrain the plurality of measured snowpack properties 136 (FIG. 5). The physical model 150 is constructed using at least one snow layer 151 and given plurality of snowpack parameters 136. At least one snow layer 151 in the physical model 150 is at minimum given variable thickness 152 (equivalent to snow depth 136c), snow water equivalent 136a, snow liquid water content 136b, and snow density 136d. The model is used to calculate a modeled excess phase 141b and modeled carrier to noise ratio reduction 142b over the plurality of satellite angles from the zenith 160 matching those from the time history 135. The non-linear mathematical solver is then used to iteratively adjust the modeled snow parameters given the merit function to minimize the difference between the measured excess phase 141*a* and the modeled excess phase 141*b* and the difference between the measured carrier to noise ratio reduction 142*a* and the modeled carrier to noise ratio reduction 142*b*. When the minimum is reached the currented modeled plurality of snowpack parameters 136 are used as the plurality of snowpack parameters 136 for the layer.

In general, this method derives the complex index of refraction for the snowpack 104 where n is the real part of the index of refraction, κ is the imaginary component of the index of refraction, and j is the imaginary number equal to $\sqrt{-1}$ as described in Equation 20.

Attenuation of the plurality of GNSS carrier signals 111 in the snowpack 104 is related to the imaginary component κ multiplied by the distance traveled within the snowpack 104 (distance is related to snow depth and elevation angle). κ is strongly influenced by the LWC 136*b* of the snowpack 104. Therefore, by deriving the imaginary component from the carrier to noise ratio reduction 142, this embodiment determines information about the snow depth 136*c* and the LWC 136*b* of the snowpack 104.

However, the plurality of GNSS carrier signals 111 is also reduced by being reflected off the snowpack 104 and therefore knowledge of the snow density 136*d* of the snowpack 104 is required. The snow density 136*d* of the snowpack 104 (with knowledge of the LWC 136*b*) relates to the real part of the index of refraction n. This real component is responsible for the decrease in speed of the plurality of GNSS carrier signals 111 within the snowpack 104, which speed when combined with the distance traveled by the plurality of GNSS carrier signals 111 in the snowpack 104 relates to the excess phase 141 observed from the snowpack 104. The SWE 136*a* is determined directly from the snow depth 136*c* and the snow density 136*d* of the snowpack 104. As seen by these relationships, the carrier to noise ratio reduction 142 and the excess phase 141 from the under-snow GNSS receiver system 102, are dependent on the plurality of snowpack parameters 136 and the plurality of satellite angle from zenith 160: the LWC 136*b*, the snow depth 136*c*, and the snow density 136*d*; from which SWE can be calculated. These parameters, the plurality of snowpack parameters 136, are solved using the multi-variable, non-linear mathematical solver 257 (FIG. 4).

The Method without Excess Phase

In some cases, the carrier to noise ratio reduction 142 of the snowpack 104 is known, but the excess phase 141 cannot be determined. In this embodiment of the method of the present invention, the method shown in the schematic in FIG. 5 is used, except only the carrier to noise ratio reduction 142 is determined and used to derive the LWC 136*b*, the snow depth 136*c*, the snow density 136*d*, and the SWE 136*a*. This method uses the physics-based snow model, the physical model 150 (FIG. 5) and the non-linear mathematical solver 157 to constrain the plurality of snowpack parameters 136 (FIG. 5). In this embodiment, the non-linear mathematical solver 157 is contrasted and applied as FIG. 7, but without the double-differenced plurality of pseudo-ranges 121*c* and the plurality of carrier phases 121*b*. The derived values from this embodiment can be further constrained using one or more frequencies from the plurality of GNSS carrier signals 111 (for example L-1 and L-2). The measured carrier to noise ratio reduction 142*a* is derived from applying the plurality of snowpack software programs 140 from the plurality of GNSS carrier signals 111 through the snowpack 104 and the plurality of carrier to noise ratios 121*a* from the under-snow GNSS receiver system 102 and the data reference system 130. In this embodiment, the data reference system 130 comprises an at least one of a nearby dissimilar out-of-snow GNSS receiver system 130*b*, a network RTK station 130*c*, a modeled reference station calculated from precise ephemeris troposphere and ionosphere data 130*d* or a time shifted self-reference 130*e*. The data reference system 130 in an embodiment can have the time shifted self-reference 130*e* employing the plurality of GNSS receiver data products 121.

The non-linear mathematical solver 157 in the method of the present invention uses mathematical methods applied to the certain apparatus disclosed and in the unique manner set forth in the present invention to simultaneously derive the plurality of snowpack parameters 136. The physical model 150 is constructed using at least one snow layer 151 and given plurality of snowpack parameters 136. At least one snow layer 151 in the physical model 150 is at minimum given variable thickness 152 (equivalent to snow depth), snow water equivalent 136*a*, snow liquid water content 136*b*, and snow density 136*d*. The model is used to calculate a modeled carrier to noise ratio reduction 142*b* over the plurality of satellite angles from the zenith 160 matching those from the time history 135. The non-linear mathematical solver is then used to iteratively adjust the modeled snow parameters given the merit function to minimize the difference between the measured carrier to noise ratio reduction 142*a* and the modeled carrier to noise ratio reduction 142*b*. When the minimum is reached the currented modeled plurality of snowpack parameters 136 are used as the measured plurality of snowpack parameters 136 for the layer.

Conceptually, any solver uses with this method the following sensitivities to find the plurality of snowpack parameters 136: (1) from the angular dependence of the carrier to noise ratio reduction 142, Brewster's Angle gives a direct measure of the real part of the index of refraction in the snowpack 136*f* which relates to the snow density 136*d* of the snowpack 104; (2) from there, the attenuation of the plurality of GNSS carrier signals 111 is due to the distance traversed by the plurality of GNSS carrier signals 111 through the snowpack 104; (3) from the attenuation the imaginary component κ is determined leads to a determination of the snow depth 136*c* and the LWC 136*b*; and (4) with the snow depth 136*c* deter mined along with the LWC 136*b*, the full attenuation problem is solved.

Alternative Embodiments of the Method

Alternative embodiments of the present invention use one or more GNSS constellation 101. These embodiments are intended in the method of the present invention to include any or all systems of the GNSS constellation 101, including without limitation, the United States' Global Positioning Systems, herein GPS, the Russia's GLONASS, the European Union's Galileo, China's BeiDou and BeiDou-2, Japan's Quasi-Zenith Satellite System herein QZSS, India's Indian Regional Navigation Satellite System herein IRNSS or NAVIC, and other satellite systems under development.

An alternative embodiment of the present invention uses the plurality of GNSS receiver data products 121 from one or more frequencies of each system of the GNSS constellation 101 to derive the carrier to noise ratio reduction 142 and the excess phase 141 used in the non-linear mathematical solver 157, FIG. 8.

An alternative embodiment of the present invention includes the ability to measure the plurality of snowpack parameters 136 including without limitation any combination of the SWE 136a, the LWC 136b, the snow depth 136c, and certain physical structures, including at least one snow layer 151 each of which have the snow density 136d varied. FIGS. 1-7. Using the known densities of ice and water, the snow density 136d can be calculated directly from the SWE 136a, the LWC 136b, and the snow depth 136c, using basic physical relationships.

An alternative embodiment of the present invention provides for collecting the plurality of GNSS receiver data products 121, the GNSS observables, from the out-of-snow GNSS receiver system 130a (FIGS. 4 and 5) which are collected with the plurality of GNSS receiver data products 121, observables, from the under-snow GNSS receiver system 102 (FIG. 5). The plurality of GNSS receiver data products 121 is used to determine the snowpack-induced, measured excess phase 141a, and is processed through Equation 9 (FIG. 4) with or without the addition of temporal, angular, and multi-satellite ensemble methods, including but not limited to average, median filtering, and Kalman filtering (FIG. 5).

An alternative embodiment of the present invention provides for the processing of the plurality of GNSS receiver data products 121 from the data reference system 130 (FIG. 5) and the plurality of GNSS receiver data products 121 from the under-snow GNSS receiver system 102 (FIGS. 4 and 5) where the double-difference equations is exchanged for single-difference processing (Equation 8 for excess phase 141, Equation 1 for carrier to noise ratio reduction 142). This is performed with or without the addition of temporal, angular, and multi-satellite ensemble elements, including but not limited to average, median filtering, and Kalman filtering. In this embodiment, additional errors may be estimated, filtered, or long-term averaged to reduce the uncertainty these elements add to the method (FIG. 5). These same elements may also be ignored, alternatively, and the associated loss in quality of plurality of GNSS receiver data products 121 simply accepted as insignificant.

In another alternative embodiment of the present invention, metrics for the LWC 136b, the SWE 136a, and the snow depth 136c for at least one snow layer 151, or multilayers of the snowpack 104, are used to calculate the modeled carrier to noise ratio reduction 142b and the modeled excess phase 141b caused by the snowpack 104. The modeling of interactions of the plurality of GNSS carrier signals 111 with the snowpack 104 relies on an electromagnetic propagation model (the physical model 150 shown in FIG. 5). This embodiment of the physical model 150 treats the air, snowpack 104, and underlying soil, the Stationary earth location 103, depicted in FIGS. 1-3, as a multi-layer dielectric stack (Katsidis and Siapkas 2002) of lossy dielectrics (Canning 2011) and applies well established optics principles to the method. Dielectric constants are based on research done on the snowpack 104 by a variety of groups (Frolov and Macheret 1999; Koch et al. 2014). The physical model 150 in this embodiment consists of at least one snow layer 151. This physical model 150 includes, without limitation, multi-layer complex impedance, Fresnel reflection, snow layer multi-path, and radio wave interference.

In another alternative embodiment of the present invention, the metrics for the LWC 136b, the SWE 136a, and the snow depth 136c are derived for one or more model layers using the non-linear mathematical solver 157 (FIG. 7). These layers may or may not correspond directly to physical layers of the snowpack 104 [These layers are denoted by the subscripts in FIG. 7. For example, $SWE_2$ is the SWE 136a in at least one snow layer 151.]. These "per-layer" metrics can be used to derive aggregate metrics for the snowpack 104 using standard statistical methodology, including but not limited to summation, averaging, and weighted averaging.

Another alternative embodiment of the present invention provides the physical model 150 with constraints on the magnitude of temporal changes in the LWC 136b, the SWE 136a, the snow depth 136c, or the snow density 136d in order to constrain these changes to physically realizable values. These temporal constraints are used to further improve the plurality of snowpack parameters 136 (either FIG. 5 or FIG. 6).

An alternative embodiment of the present invention uses the non-linear mathematical solver 157 (FIG. 7), being multi-variable, to solve metrics of the snowpack 104 which results in a modelled carrier to noise ratio reduction 142b and a modelled excess phase 141b, both best agreeing with the measured carrier to noise ratio reduction 142a and the measured excess phase 141a (FIG. 5). The non-linear mathematical solver 157 is implemented using several known nonlinear, multi-variable mathematical algorithms, including but not limited to the following: a Levenberg-Marquardt or genetic algorithms.

Another alternative embodiment of the present invention provides observations of snow-induced GNSS changes in plurality of carrier phase 121b and the plurality of carrier to noise ratio 121a for various satellite-to-receiver geometries for constraining or converging the physical model 150 to the plurality of snowpack parameters 136 (FIG. 5).

Another alternative embodiment of the present invention provides observations from external sensors, including but not limited, to the snow depth 136c, snow temperature, air temperature, temporal plurality of snowpack parameters 156 or other modeled parameters used to assist in for constraining or converging the physical model 150 to the plurality of snowpack parameters 136. (either FIG. 5 or FIG. 6).

An alternative embodiment of the present invention provides observations acquired from an out-of-snow GNSS receiver system 130a acting as a data reference system 130 (FIG. 1-3) that is co-located with the under-snow GNSS receiver system 102 and is mounted on a pole, tower, or other structure to elevate it above the snowpack 104.

An alternative embodiment of the present invention having the data reference system 130 (FIGS. 1-3) is comprised of components that are not physically similar to the associated components on the under-snow GNSS receiver system 102.

An alternative embodiment of the present invention compares the measurements, the plurality of GNSS receiver data products 121 from the under-snow GNSS receiver system 102 (FIGS. 4 and 5) to the plurality of GNSS receiver data products 121 from the out-of-snow GNSS receiver system 130a, or other non-snow impacted reference GNSS measurements, that are not collocated; and the plurality of GNSS receiver data products 121 from the out-of-snow GNSS receiver system 130a, or other non-snow impacted reference GNSS measurements, is transmitted via radio, Internet, or other communication platform (i.e., the data reference system 130 (FIG. 3)).

Another alternative embodiment of the present invention uses the plurality of GNSS receiver data products 121 from the under-snow GNSS receiver system 102 (FIGS. 1, 4 and 5) for the anchored measuring antenna 106, or similar antennas, to make a correction function or calibration that modifies observations from the data reference system 130 (FIG. 5), observations from the under-snow GNSS receiver system 102 (FIG. 1), or both, to correct systematic errors associated with the GNSS receivers 108.

An alternative embodiment of the present invention accesses the plurality of GNSS receiver data products 121 from one or more data reference systems 130 (FIG. 3) through the internet or other communication platform and are exchanged for the plurality of GNSS receiver data products 121 that would otherwise be provided by the data reference system 130 (FIG. 5). This plurality of GNSS receiver data products 121 may originate from one or more physical stations and virtual reference stations. Virtual references stations are sometimes provided by network RTK services and provide a model-based simulated data reference system 130 as is otherwise derived from ground-based reference stations.

Another alternative embodiment of the present invention rotationally aligns the anchored measuring antenna 106 of the data reference system 130 (FIG. 1) to the anchored measuring antenna 106 to the under-snow GNSS receiver system 102 (FIG. 1) with respect to the vector of the zenith 145, (FIG. 8). This embodiment of the method serves to minimize errors introduced by asymmetric antenna gain variation and phase center variation that are similar for these two antennas.

An alternative embodiment of the present invention uses an estimated antenna gain pattern for the under-snow GNSS receiver system 102 and the data reference system 130 to correct for errors in the associated plurality of carrier to noise ratio 121a, FIGS. 1-4.

Another alternative embodiment of the present invention uses an estimated antenna phase center variation for the under-snow GNSS receiver system 102 and the data reference system 130, shown in FIGS. 1-3, to correct or remove the associated errors in the measured excess phase 141a.

Another alternative embodiment of the present invention derives the location of each of the under-snow GNSS receiver system 102 and out-of-snow GNSS receiver system 130a using techniques commonly used including but not limited to precise surveying, precise pointing positioning (PPP), and real time kinetic (RTK).

Another alternative embodiment of the present invention uses plurality of GNSS receiver data products 121 collected by the under-snow GNSS receiver system 102 (FIGS. 1 and 5) during snow-free time periods as a basis for a model of the plurality of GNSS receiver data products 121 for the data reference system 130. This model can generate the plurality of GNSS receiver data products 121 which would otherwise be generated from the data reference system 130 thus eliminating the need for a data reference system 130.

Another alternative embodiment of the present invention detects a GNSS receiver cycle slip resulting in arbitrary integer wavelength change in the plurality of carrier phases 121b of the plurality of standard GNSS data products 121 by comparing temporally offset values of any combination of the plurality of carrier phases 121b and derivation of the excess phase 141. FIGS. 4-8. Instances of cycle slip are detected when discontinuities which are an integer multiple of the wavelength occur in the trend of the plurality of carrier phases 121b and the trend of the excess phase 141 that is derived. The detected cycle slip is corrected by adding an integer number of wavelengths to plurality of carrier phase 121b that is temporarily offset and measured excess phase 141a that is derived as to eliminate the discontinuity in the plurality of carrier phase 121b and measured excess phase 141a introduced by the GNSS receiver cycle slip.

Another alternative embodiment of the present invention acquires the plurality of GNSS receiver data products 121 from the under-snow GNSS receiver system 102 having the anchored measuring antenna 106 comprised of an array of antenna elements connected to the GNSS receiver 108, shown in FIGS. 1-3. The connection of each antenna element to the GNSS receiver 108 may include, without limitation, phase-delay circuitry, radio frequency combination circuitry, and phase-matching circuitry.

Figure 6:
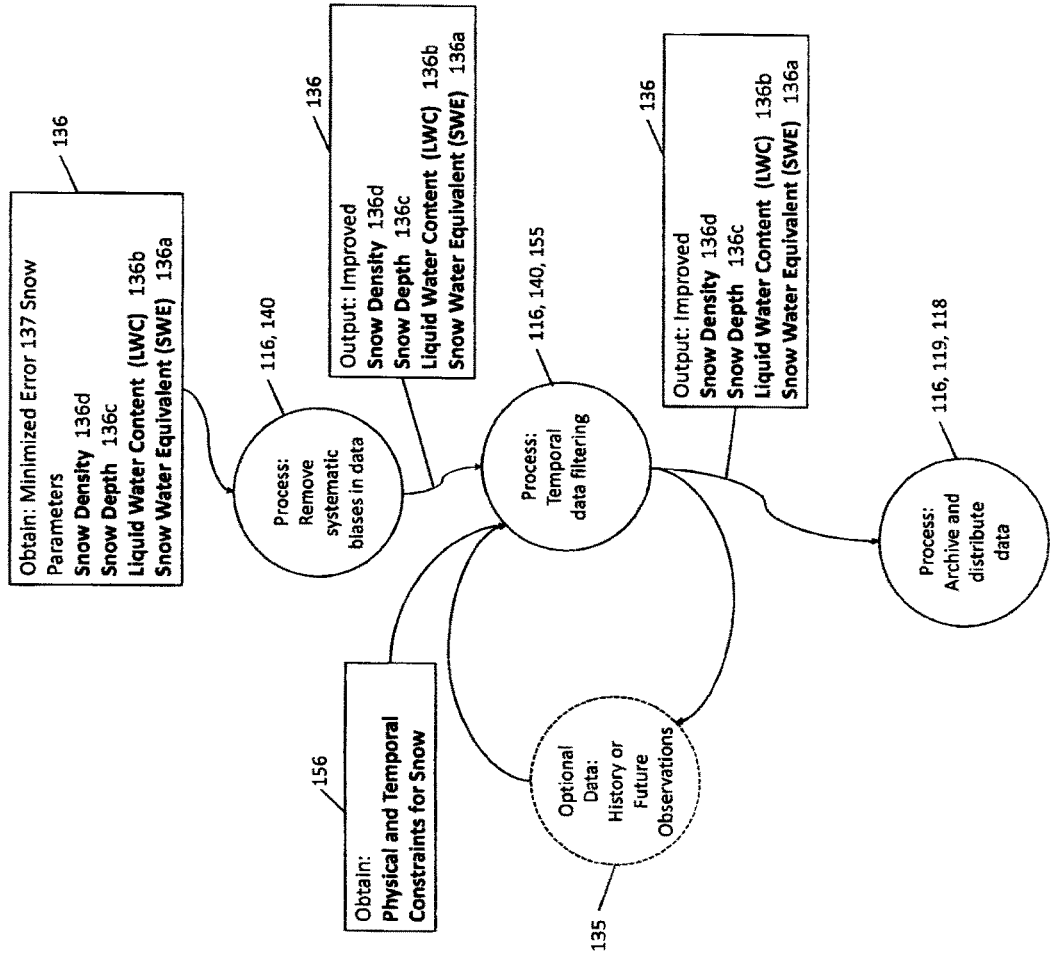
FIG. 6 illustrates in one embodiment of the present invention, a flowchart of the method of using a set of optional mathematical data filters that can be applied to the plurality of snowpack parameters to improve data quality using knowledge about the snowpack.

Other embodiments of the present invention filter the plurality of snowpack parameters 136 by a set of processing filters 155 to improve data quality (FIG. 6). In signal processing common in this industry, a filter is a process that removes some unwanted components or features from a signal, and filtering is a class of signal processing, the defining feature of filters being the complete or partial suppression of some aspect of the signal, removing some frequencies or frequency bands. This can be achieved in this embodiment by using several algorithms, including but not limited to time averaging and Kalman filtering. The plurality of snowpack parameters 136 for the snowpack 104 are passed through a set of processing filters 155 having a temporal plurality of snowpack parameters 156, respectively for the measured plurality of snowpack parameters 136.

In other alternative embodiments, the non-linear mathematical solver 157 used to determine the snow properties is constructed in a way as to restrict temporal changes in the plurality of snowpack parameters 136 to reasonable values observed in nature. This can be achieved using algorithms which incrementally update system state variables using each temporal observation including but not limited to extended Kalman filters. See FIG. 7.

In alternative embodiments, the plurality of snowpack parameters 136 can be constrained in post-processing using one or both of a prior known plurality of snowpack parameters 136 and posterior known plurality of snowpack parameters 136 to constrain the optimization problem (FIG. 6).

In alternative embodiments, the physical model 150 is produced with one or more layers of a variable thickness 152 and each one or more layer is given a variable snow complex dielectric permittivity 136e in place of a variable liquid water content 136b, variable snow water equivalent 136a, and variable density 136d.

In alternative embodiments, the plurality of snowpack parameters 136 can be constrained by providing into the snow pack model an independent measurement of one or more of the plurality of snowpack parameters 136. This parameter, such as snow depth, is now either used as the actual measurement of this parameter or used to constrain this parameter in the model. When used as the parameter the number of unknowns in the physical model 150 is reduced. When used as a constraint the modeled snow parameter is held within a given range of an at least one independently measured snow parameter 146. This embodiment of the method serves to minimize errors in the derived plurality of snowpack parameters 136 caused by interactions between snowpack parameters. The at least one independently measured parameter 146 is applied to the non-linear mathematical solver 157, constraining the plurality of snowpack parameters 136. The at least one independently measured parameter 146 comprises at least one of the plurality of snowpack parameters 136.

Having thus described in detail a preferred selection of embodiments of the present invention, it is to be appreciated, and will be apparent to those skilled in the art, that numerous variations and substitutions may be made in the present invention, its use, and its configuration and to achieve the same or similar result and many physical changes could be made in the method without altering the invention, or the concepts and principles embodied therein.

Unless otherwise specifically stated, the terms and expressions have been used herein as terms of description and not terms of limitation and are not intended to exclude any equivalents of features shown and described or portions thereof. Various changes can, of course, be made to the preferred embodiment without departing from the spirit and scope of the present invention. The present invention method, therefore, should not be restricted, except in the following claims and their equivalents.

Although specific advantages have been enumerated above, various embodiments may include some, none, or all the enumerated advantages.

Other technical advantages may become readily apparent to one of ordinary skill in the art after review of the figures and description provided herein.

It should be understood at the outset that, although exemplary embodiments are illustrated in the figures and described herein, the principles of the present disclosure may be implemented using any number of techniques, whether currently known or not. The present disclosure should in no way be limited to the exemplary implementations and techniques illustrated in the drawings and described herein.

Unless otherwise specifically noted, articles depicted in the drawings are not necessarily drawn to scale.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

REFERENCES

The following documents are incorporated herein by reference in their entirety:

Astifan, Brian, Jay Breidenbach, Ed Clark, Tracy Clark, Joe Intermill, Dan Luna, Glenn Lussky, Kevin Werner, and Ray Wolf 2012. "Service Assessment: The Missouri/Souris River Floods of May-August 2011." https://verification.nws.noaa.gov/sats/sa/pdf/Missouri_floods11.pdf.

Canning, Francis X. 2011. "Corrected Fresnel Coefficients for Lossy Materials." In *IEEE International Symposium on Antennas and Propagation (APSURSI)*, 2123-26. https://doi.org/10.1109/APS0.2011.5996930.

Dobson, Myron C., Fawwaz T. Ulaby, Martti T. Hallikainen, and Mohamed A. El-Rayes. 1985. "Microwave Dielectric Behavior of Wet Soil-Part II: Dielectric Mixing Models." *IEEE Transactions on Geoscience and Remote Sensing* GE-23 (1): 35-46. https://doi.org/10.1109/TGRS.1985.289498.

Easterling, D. R., K. E. Kunkel, J. R. Arnold, T. Knutson, A. N. LeGrande, L. R. Leung, R. S. Vose, D. E. Walsier, and M. F. Wehner. 2017. "Precipitation Changes in the United States." In *Climate Science Special Report: Fourth Nation Climate Assessment*, edited by D. J. Wuebbles, D. W. Fahey, K. A. Hibbard, D. J. Dokken, B. C. Stewart, and T. K. Maycock, Volume I, 207-30. Washington, D.C., USA: U.S. Global Change Research Program.

Endo, Toni, Toshishige Fujii, Shigehiro Iikura, Shinya Shishido, and Haruo Yamamoto. 2007. Property Measuring Device. JP2007212286A, issued 2007.

Frolov, Anatoly D, and Yury Ya. Macheret. 1999. "On Dielectric Properties of Dry and Wet Snow." *Hydrological Processes* 13 (May 1998): 1755-60. https://doi.org/10.1002/(SICI)1099-1085(199909)13:12/13<1755::AID-HYP854>3.0.CO;2-T.

Gutmann, Ethan D., Kristine M. T arson, Mark W. Williams, Felipe G. Nievinski, and Valery Zavorotny. 2012. "Snow Measurement by GPS Interferometric Reflectometry: An Evaluation at Niwot Ridge, Colo." *Hydrological Processes* 26 (19): 2951-61. https://doi.org/10.1002/hyp.8329.

Henkel, P., F. Koch, F. Appel, H. Bach, M. Prasch, L. Schmid, J. Schweizer, and W. Mauser. 2018. "Snow Water Equivalent of Dry Snow Derived From GNSS Carrier Phases." *IEEE Transactions on Geoscience and Remote Sensing* PP (99): 1-12. https://doi.org/10.1109/TGRS.2018.2802494.

Jacobson, M. D. 2008. "Dielectric-Covered Ground Reflectors in GPS Multipath Reception-Theory and Measurement." *IEEE Geoscience and Remote Sensing Letters* 5 (3): 396-99. https://doi.org/10.1109/LGRS.2008.917130.

Jacobson, Mark D. 2010. "Inferring Snow Water Equivalent for a Snow-Covered Ground Reflector Using GPS Multipath Signals." *Remote Sensing* 2 (10): 2426-41. https://doi.org/10.3390/rs2102426.

Jacobson, Mark D. 2014. "Estimating Snow Water Equivalent for a Slightly Tilted Snow-Covered Prairie Grass Field by GPS Interferometric Reflectometry." *EURASIP Journal on Advances in Signal Processing* 2014 (1): 61. https://doi.org/10.1186/1687-6180-2014-61.

Katsidis, C. C., and D. I. Siapkas. 2002. "Systems With Coherent, Partially Coherent, and Incoherent Interference." *Applied Optics* 41 (19): 3978-87. https://doi.org/10.1364/AO.41.003978.

Koch, Franziska. 2017. "SNOW COVER PROPERTIES AND SOIL MOISTURE DERIVED FROM GPS SIGNALS." Ludwig Maximilian University of Munich. https://doi.org/10.1016/j.flora.2009.12 0.037.

Koch, Franziska, Wolfram Mauser, Florian Appel, and Patrick Henkel. 2017. A method for determining parameters of snow. DE102017110992A1, issued 2017.

Koch, Franziska, Monika Prasch, Lino Schmid, Jürg Schweizer, and Wolfram Mauser. 2014. "Measuring Snow Liquid Water Content with Low-Cost GPS Receivers." *Sensors* 14 (11): 20975-99. https://doi.org/10.3390/s141120975.

Kochanski, Kelly Anne. 2015. "Ice and the Apparent Variation of GPS Station Positions for Alaska." Massachusetts Institute of Technology.

Larson, Kristine M., Ethan D. Gutmann, Valery U. Zavorotny, John J. Braun, Mark W. Williams, and Felipe G. Nievinski. 2009. "Can We Measure Snow Depth with GPS Receivers?" Geophysical Research Letters 36 (17): L17502. https://doi.org/10.1029/2009GL039430.

Ozeki, Masaru, and Kosuke Heki 2012. "GPS Snow Depth Meter with Geometry-Free Linear Combinations of Carrier Phases." *Journal of Geodesy* 86 (3): 209-19. https://doi.org/10.1007/s00190-011-0511-x.

Pierce, J. A., M Bushman, D Cummings, D Feichtigher, N Gollehon, M Gonella, M Green, et al. 2010. "A Measure of Snow: Case Studies of the Snow Survey and Water Supply Forecasting Program." Washington, D.C.

Stranden, Heidi Bache, Bjørg Lirhus Ree, and Knut M Moen. 2015. Recommendations for Automatic Measurements of Snow Water Equivalent in NVE.

Sturm, Matthew, Brian Taras, Glen E. Liston, Chris Derksen, Tobias Jonas, and Jon Lea. 2010. "Estimating Snow Water Equivalent Using Snow Depth Data and Climate Classes." *Journal of Hydrometeorology* 11 (6): 1380-94. https://doi.org/10.1175/2010JHM1202.1.

We claim:

1. A method of analyzing snowpack, the method comprising:
   (a) Utilizing a GNSS constellation having an at least one Earth orbiting GNSS satellite uniquely positioned and the at least one Earth orbiting GNSS satellite transmitting a plurality of GNSS carrier signals through an Earth atmosphere, the plurality of GNSS carrier signals carrying encoded GNSS data comprising: a coded timing reference, and a satellite ephemeris;
   (b) Employing a GNSS receiver capable of decoding the encoded GNSS data from the at least one Earth orbiting GNSS satellite into a plurality of GNSS receiver data products comprising: a plurality of carrier to noise ratios, a plurality of carrier phases, a plurality of pseudo-ranges, raw ephemeris data, and a receiver clock data;
   (c) Employing an under-snow GNSS receiver system comprising: a measuring antenna attached to a ground plane and anchored to a stationary Earth location, the under-snow GNSS receiver system connected to the GNSS receiver;
   (d) Allowing a snowpack to accumulate over the under-snow GNSS receiver system measuring antenna;
   (e) Employing a data reference system located near the under-snow GNSS receiver system;
   (f) Locating and identifying the stationary Earth location to the under-snow GNSS receiver system and locating the Earth location to the data reference system;
   (g) Receiving the plurality of GNSS carrier signals having encoded GNSS data within at least one timeframe at both the under-snow GNSS receiver system and the data reference system;
   (h) Employing a computer system attaching to the under-snow GNSS receiver system and to the data reference system to receive the plurality of GNSS receiver data products decoded by the respective under-snow GNSS receiver system and the data reference system, the computer system having a plurality of computer communication protocols to receive the plurality of GNSS receiver data products, a digital computer memory storing the plurality of GNSS receiver data products, and a processing unit to process the plurality of GNSS receiver data products;
   (i) Providing the computer system with a plurality of snowpack software programs;
   (j) Employing the plurality of snowpack software programs and digital computer memory to store a time history of the plurality of GNSS receiver data products over a plurality of satellite angles from a zenith from both the under-snow GNSS receiver system and the data reference system;
   (k) Determining a measured excess phase using the plurality of snowpack software programs deriving from the plurality of GNSS carrier signals through the snowpack at the stationary Earth location to the respective GNSS receiver, and utilizing the plurality of GNSS receiver data products from both the under-snow GNSS receiver system and the data reference system, the GNSS receiver data products comprising: at least one of the plurality of carrier phases, the plurality of the pseudo-ranges, the raw ephemeris data or the receiver clock data;
   (l) Determining a measured carrier to noise ratio reduction, deriving from applying the plurality of snowpack software programs from the plurality of GNSS carrier signals through the snowpack and the plurality of carrier to noise ratios from the under-snow GNSS receiver system and the data reference system;
   (m) Constructing a physical model using at least one snow layer of a variable thickness within the snowpack, employing the physical model in the plurality of snowpack software programs, calculating a modeled excess phase and a modeled carrier noise ratio reduction over the plurality of satellite angles from the zenith, and calculating a plurality of measured snowpack parameters, the plurality of measured snowpack parameters comprising: a snow water equivalent, a snow liquid water content, a snow depth, and a snow density, of the at least one snow layer;
   (n) Employing a non-linear mathematical solver within the plurality of snowpack software programs to adjust the plurality of snow parameters and minimize a minimum error between a measured excess phase and the modeled excess phase as well as the measured carrier to noise ratio reduction and the modeled carrier to noise ratio reduction by varying the snow water equivalent, the snow liquid water content, the snow depth, recalculating the snow density of the at least one snow layer in the physical model until the minimum error is achieved;
   (o) Using the resulting snow water equivalent, the snow liquid water content, the snow depth, and the snow density of the at least one snow layer from the physical model, for describing the at least one snow layer; and
   (p) Analyzing the measured plurality of snowpack parameters, respectively of the at least one snow layer to determine for the snowpack the snow depth, the snow water equivalent, and the snow liquid water content, and averaging the snow density of the snowpack and calculating and distributing the plurality of measured snowpack parameters within the snowpack.

2. The method of analyzing snowpack of claim 1, the method further comprising: passing the measured plurality of snowpack parameters for the snowpack through a set of processing filters having a temporal plurality of snowpack parameters, respectively for the measured plurality of snowpack parameters.

3. The method of analyzing snowpack of claim 1, the method further comprising:
   (a) Having the data reference system comprising: an out-of-snow GNSS receiver system, the out-of-snow GNSS receiver system comprising: a reference antenna attached to a ground plane anchored to the known stationary Earth location and connected to the GNSS receiver; the out-of-snow GNSS receiver system receiving the plurality of GNSS carrier signals with encoded GNSS data not passing through the snowpack, and providing the plurality of GNSS receiver data products to the computer system; and (b) Receiving the plurality of GNSS carrier signals within the at least one timeframe at the out-of-snow GNSS receiver system.

4. The method of analyzing snowpack of claim 1, the method further comprising: providing the data reference system comprising: at least one of a nearby dissimilar out-of-snow GNSS receiver system, a network RTK station, or a modeled reference station calculated from precise ephemeris troposphere and ionosphere data.

5. The method of analyzing snowpack of claim 1, the method further comprising: applying at least one independently measured parameter to the non-linear mathematical solver, constraining the plurality of snowpack parameters; the at least one independently measured parameter comprising: at least one of the plurality of snowpack parameters.

6. A method of analyzing snowpack, the method comprising:
 (a) Utilizing a GNSS constellation having an at least one Earth orbiting GNSS satellite uniquely positioned and the at least one Earth orbiting GNSS satellite transmitting a plurality of GNSS carrier signals through an Earth atmosphere, the plurality of GNSS carrier signals carrying encoded GNSS data comprising: a coded timing reference, and a satellite ephemeris;
 (b) Employing a GNSS receiver capable of decoding the encoded GNSS data from the at least one Earth orbiting GNSS satellite into a plurality of GNSS receiver data products comprising: a plurality of carrier to noise ratios, and raw ephemeris data;
 (c) Employing an under-snow GNSS receiver system comprising: a measuring antenna attached to a ground plane and anchored to a stationary Earth location, the under-snow GNSS receiver system connected to the GNSS receiver;
 (d) Allowing a snowpack to accumulate over the under-snow GNSS receiver system measuring antenna;
 (e) Employing a data reference system located near the under-snow GNSS receiver system;
 (f) Locating the under-snow GNSS receiver system at the respective stationary Earth location to the under-snow GNSS receiver system and locating the data reference system at the respective stationary Earth location to the data reference system;
 (g) Receiving the plurality of GNSS carrier signals having encoded GNSS data within at least one timeframe at both the under-snow GNSS receiver system and the data reference system;
 (h) Employing a computer system attaching to the under-snow GNSS receiver system and to the data reference system to receive the plurality of GNSS receiver data products decoded by the respective under-snow GNSS receiver system and the data reference system, the computer system having a plurality of computer communication protocols to receive the plurality of GNSS receiver data products, a digital computer memory storing the plurality of GNSS receiver data products, and a processing unit to process the plurality of GNSS receiver data products;
 (i) Providing the computer system with a plurality of snowpack software programs;
 (j) Employing the plurality of snowpack software programs and digital computer memory to store a time history of the plurality of GNSS receiver data products over a plurality of satellite angles from a zenith from the under-snow GNSS receiver system and the data reference system;
 (k) Determining a measured carrier to noise ratio reduction, deriving from applying the plurality of snowpack software programs from the plurality of GNSS carrier signals through the snowpack and the plurality of carrier to noise ratios from the under-snow GNSS receiver system and the data reference system;
 (l) Constructing a physical model using at least one snow layer of a variable thickness within the snowpack, employing the physical model in the plurality of snowpack software programs, and calculating a modeled carrier noise ratio reduction over the plurality of satellite angles from the zenith, and calculating a plurality of measured snowpack parameters, the measured plurality of snowpack parameters comprising: a snow water equivalent, a snow liquid water content, a snow depth, and a snow density, of the at least one snow layer;
 (m) Employing a non-linear mathematical solver within the plurality of snowpack software programs to adjust the plurality of snow parameters and minimize a minimum error between the measured carrier to noise ratio reduction and a modeled carrier to noise ratio reduction by varying the snow water equivalent, the snow liquid water content, the snow depth, recalculating the snow density of the at least one snow layer in the physical model until the minimum error is achieved;
 (n) Using the resulting snow water equivalent, the snow liquid water content, the snow depth, and the snow density, of the at least one snow layer from the physical model for describing the at least one snow layer;
 (o) Analyzing the plurality of measured snowpack parameters, respectively of the at least one snow layer to determine for the snowpack the snow depth, the snow water equivalent, and the snow liquid water content, and averaging the snow density of the snowpack and calculating and distributing the plurality of measured snowpack parameters within the snowpack.

7. The method of analyzing snowpack of claim 6, the method further comprising: passing the measured plurality of snowpack parameters for the snowpack through a set of processing filters having a temporal plurality of snowpack parameters, respectively for the measured plurality of snowpack parameters.

8. The method of analyzing snowpack of claim 6, the method further comprising:
 (a) Having the data reference system comprising: an out-of-snow GNSS receiver system, the out-of-snow GNSS receiver system comprising: a reference antenna attached to a ground plane anchored to the known stationary Earth location and connected to the GNSS receiver and the out-of-snow GNSS receiver system receiving the plurality of GNSS carrier signals with encoded GNSS data not passing through snowpack, and providing the plurality of GNSS receiver data products to the computer system; and
 (b) Receiving the plurality of GNSS carrier signals within the at least one timeframe at the out-of-snow GNSS receiver system.

9. The method of analyzing snowpack of claim 6, the method further comprising: providing the data reference system comprising: an at least one of a nearby dissimilar out-of-snow GNSS receiver system, a network RTK station, a modeled reference station calculated from precise ephemeris troposphere and ionosphere data or a time shifted self-reference.

10. The data reference system of claim 9, further comprising: having the time shifted self-reference employing the plurality of GNSS receiver data products.

11. The method of analyzing snowpack of claim 6, the method further comprising: applying at least one independently measured parameter to the non-linear mathematical solver, constraining the plurality of snowpack parameters; the at least one independently measured parameter comprising: at least one of the plurality of snowpack parameters.

* * * * *